US012413511B2

(12) United States Patent
Xie et al.

(10) Patent No.: US 12,413,511 B2
(45) Date of Patent: Sep. 9, 2025

(54) PACKET PROCESSING METHOD AND RELATED DEVICE

(71) Applicant: Huawei Technologies Co., Ltd., Shenzhen (CN)

(72) Inventors: Jingrong Xie, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 18/519,887

(22) Filed: Nov. 27, 2023

(65) Prior Publication Data

US 2024/0098019 A1    Mar. 21, 2024

Related U.S. Application Data

(63) Continuation of application No. PCT/CN2022/076571, filed on Feb. 17, 2022.

(30) Foreign Application Priority Data

May 27, 2021   (CN) .......................... 202110584982.3

(51) Int. Cl.
*H04L 45/00* (2022.01)
*H04L 45/302* (2022.01)
*H04L 45/50* (2022.01)
*H04L 45/76* (2022.01)

(52) U.S. Cl.
CPC ............ *H04L 45/34* (2013.01); *H04L 45/302* (2013.01); *H04L 45/50* (2013.01); *H04L 45/76* (2022.05)

(58) Field of Classification Search
None
See application file for complete search history.

(56) References Cited

U.S. PATENT DOCUMENTS

| 10,880,121 | B1 * | 12/2020 | J ........................ H04L 12/4645 |
| 11,477,119 | B1 * | 10/2022 | Shaw .................... H04L 45/02 |
| 11,683,271 | B1 * | 6/2023 | Brissette ................ H04L 45/34 370/389 |

(Continued)

FOREIGN PATENT DOCUMENTS

| CN | 112583718 B | * | 9/2022 |
| WO | 2020083056 A1 | | 4/2020 |

(Continued)

OTHER PUBLICATIONS

Przygienda, T., et al., "M-ISIS: Multi Topology (MT) Routing in Intermediate System to Intermediate Systems (IS-ISs)," Network Working Group, RFC 5120, Feb. 2008, 14 pages.

(Continued)

*Primary Examiner* — Phyllis A Book
(74) *Attorney, Agent, or Firm* — Conley Rose, P.C.

(57) ABSTRACT

In a packet processing method, when a tenant has different QoS requirements for different traffic, indication information that meets a QoS requirement for the traffic can be autonomously selected, and an SRv6 packet that includes the indication information is obtained and sent to a PE device in a provider network, so that the PE device in the provider network can be aware of the QoS requirement of the tenant for the traffic, to provide, for the traffic, a service that meets the QoS requirement.

20 Claims, 13 Drawing Sheets

(56) References Cited

U.S. PATENT DOCUMENTS

| | | | | |
|---|---|---|---|---|
| 2018/0375763 A1* | 12/2018 | Brissette | ................. | H04L 45/74 |
| 2020/0084147 A1* | 3/2020 | Gandhi | .................. | H04L 43/20 |
| 2020/0145321 A1* | 5/2020 | Pignataro | ............. | H04L 49/602 |
| 2020/0328977 A1* | 10/2020 | Pfister | ................. | H04L 67/5681 |
| 2021/0037410 A1* | 2/2021 | Lee | ........................ | H04L 45/34 |

FOREIGN PATENT DOCUMENTS

| | | | |
|---|---|---|---|
| WO | 2021021172 A1 | 2/2021 | |
| WO | 2021043232 A1 | 3/2021 | |

OTHER PUBLICATIONS

M. Westerlund et al: "RTP Topologies", IETF RFC 7667, Nov. 2015, total 48 pages.

H. Schulzrinne et al: "RTP: A Transport Protocol for Real-Time Applications", IETF, RFC 3550, total 89 pages.

K. Fang et al: "Segment Routing over UDP(SRoU) draft-zartbot-sr-udp-00", IETF, Jun. 29, 2020, total 16 pages.

C. Filsfils, Ed et al: "Segment Routing over IPv6 (SRv6) Network Programming", IETF, RFC 8986, Feb. 2021, total 34 pages.

\* cited by examiner

Topology 1:

Topology 2:

SRv6 packet 1:

Packet 2 (sent by a PE device 1):

SRv6 packet 4:

SRv6 packet 1:

PACKET PROCESSING METHOD AND RELATED DEVICE

CROSS-REFERENCE TO RELATED APPLICATIONS

This application is a continuation of International Patent Application No. PCT/CN2022/076571 filed on Feb. 17, 2022, which claims priority to Chinese Patent Application No. 202110584982.3 filed on May 27, 2021. The disclosures of the aforementioned applications are hereby incorporated by reference in their entireties.

TECHNICAL FIELD

The present disclosure relates to the field of communications technologies, and in particular, to a packet processing method and a related device.

BACKGROUND

When traffic of a tenant needs a bearer service of a provider network, a provider edge (PE) device directs, according to an agreement between the provider and the tenant, the traffic of the tenant to a Segment Routing over Internet Protocol (TP) version 6 (SRv6) tunnel that is established in the provider network, and forwards the traffic through the SRv6 tunnel. In this way, the tenant can forward traffic only by using a pre-agreed service class, which is not friendly to the tenant and has poor user experience.

SUMMARY

Based on this, the present disclosure provides a packet processing method and a related device. A tenant has different quality of service (QoS) requirements for different traffic. Different QoS requirements correspond to different service classes. A PE device in a provider network can provide corresponding services to tenants based on service classes corresponding to different QoS requirements. Traffic is forwarded based on different service classes, so that the provider network can provide more flexible and friendly bearer services to tenants.

According to a first aspect, the present disclosure provides a packet processing method. For example, the method may include: A first customer-side device that belongs to a first tenant obtains a first SRv6 packet, and sends the first SRv6 packet to a first PE device, where the first SRv6 packet includes first indication information, and the first indication information indicates a first quality of service QoS requirement of the first tenant on a provider network. As can be seen, when a tenant has different QoS requirements for different traffic, for different traffic, indication information that meets a QoS requirement for the traffic can be autonomously selected, and an SRv6 packet that includes the indication information is obtained and sent to a PE device in a provider network, so that the PE device in the provider network can be aware of the QoS requirement of the tenant for the traffic, to provide, for the traffic, a service that meets the QoS requirement. Therefore, a tenant and a provider do not need to reach an agreement repeatedly for different traffic, and a provider network also does not need to establish a new SRv6 tunnel according to a newly added agreement, so that the provider network provides a flexible and friendly bearer service to the tenant, to improve use experience of the tenant regarding the bearer service of the provider network.

It should be noted that, in the present disclosure, the first indication information indicates the first QoS requirement of the first tenant on the provider network. Alternatively, it may be explained that the first indication information indicates the provider network to provide a first transmission service type to the first tenant. Alternatively, it may be explained that the first indication information indicates a provider device to provide a service to the first tenant through a first path associated with the first indication information. In this way, a transmission service that meets the first QoS requirement can be provided to the first tenant. A service provided based on the first transmission service type can meet the first QoS requirement. A service that corresponds to the first transmission service type and that is provided by the provider to the first tenant based on the first path can meet the first QoS requirement. The service provided by the provider may be understood as a service provided by the provider to the first tenant through an edge device, for example, a service provided by the provider to the first tenant through a first PE.

Similarly, the first tenant may send second indication information to the first PE device, to indicate a second QoS requirement of the first tenant on the provider network. Similarly, the second indication information indicates the second QoS requirement of the first tenant on the provider network. Alternatively, it may be explained that the second indication information indicates the provider network to provide a second transmission service type to the first tenant. Alternatively, it may be explained that the second indication information indicates a provider device to provide a service to the first tenant through a second path associated with the second indication information. In this way, a transmission service that meets the second QoS requirement can be provided to the first tenant. A service provided based on the second transmission service type can meet the second QoS requirement. A service that corresponds to the second transmission service type and that is provided by the provider to the first tenant based on the second path can meet the second QoS requirement.

For another QoS requirement of the first tenant or another tenant, an implementation is similar to that in the foregoing.

The first customer-side device may be a host, or may be a customer edge (CE) device, or may be customer-premises equipment (CPE). Similarly, the second customer-side device may be a destination host of the first tenant that the first SRv6 packet needs to reach or a CE device or CPE connected to the destination host, and the second customer-side device is connected to the provider network via a second PE device. The first PE and the second PE belong to the provider network. The first SRv6 packet may include an address of the second customer-side device, to indicate the first SRv6 packet to pass through or reach the second customer-side device.

It should be noted that the CE device in the foregoing description refers to a network device such as a switch or a router that connects the host and the PE device in the provider network. In some embodiments, the CE device may be used as a general term for the host and the network device such as a switch or a router that connects the host and the PE device in the provider network.

In an implementation, an outer destination IP address of the first SRv6 packet is a first IPv6 address, and the first IPv6 address is used for carrying the first indication information. In an example, the first IPv6 address belongs to a dedicated IPv6 address set (which may also be referred to as an IPv6 network segment) allocated by the first PE device to the first tenant. The dedicated IPv6 address set includes a plurality of IPv6 addresses, and each IPv6 address in the plurality of IPv6 addresses corresponds to a different QoS requirement of the first tenant. In another example, a Function field or an Argument field of the first IPv6 address is used for carrying the first indication information.

In another implementation, to simplify one-to-one configuration of a PE device connected to a customer-side device and the customer-side device one by one, a standard service code may be used as indication information. In other words, the provider network may agree with each tenant on a QoS requirement represented by the service code. The first SRv6 packet includes the first indication information, and the first indication information may be a service code corresponding to the first QoS requirement. In an example, an IPv6 extension header of the first SRv6 packet may carry the first indication information. In another example, a Traffic Class field in an IPv6 header of the first SRv6 packet may carry the first indication information.

The first QoS requirement includes at least one of the following: a path overhead requirement, a latency requirement, a bandwidth requirement, a link jitter requirement, a bit error requirement, and a to-be-allocated fiber wavelength or timeslot requirement.

In an implementation, the first customer-side device of the first tenant may obtain a second SRv6 packet, and send the second SRv6 packet to the first PE device, where the second SRv6 packet includes second indication information, and the second indication information indicates a second QoS requirement of the first tenant on the provider network. It can be learned that, when a same tenant has different QoS requirements for different traffic, for different traffic, a service that meets a QoS requirement for the traffic can be autonomously selected, so that the provider network provides a flexible and friendly bearer service to a same tenant.

In some implementations, before the first customer-side device obtains the first SRv6 packet, the method may further include: The first customer-side device obtains correspondences between a plurality of groups of indication information and QoS requirements, where the correspondences include, but not limited to, a correspondence between the first indication information and the first QoS requirement. In an example, that the first customer-side device obtains the correspondence between the first indication information and the first QoS requirement may be: The first customer-side device receives configuration information from the first PE device, where the configuration information indicates the correspondence between the first indication information and the first QoS requirement. In another example, that the first customer-side device obtains the correspondence between the first indication information and the first QoS requirement may be: The first customer-side device receives configuration information from a service management device, where the configuration information indicates the correspondence between the first indication information and the first QoS requirement. In this way, the configuration information including the correspondence between the first indication information and the first QoS requirement is configured on the first PE device or the service management device, and the configuration information is sent to the first customer-side device of the first tenant, so that the first tenant can learn, on the first customer-side device, the first indication information corresponding to the first QoS requirement required for traffic, to allow a packet of the traffic to carry the first indication information to indicate the provider network to provide a corresponding service for the traffic.

In an implementation, the first SRv6 packet includes an IPv6 header and a segment routing header (SRH), a segment identifier list (SID list) of the SRH may include a SID of the first PE device and a SID of the second customer-side device, the second customer-side device belongs to the first tenant, the second customer-side device is connected to the provider network by the second PE device, and the second customer-side device may be a destination host of the first SRv6 packet, or may be a CE device or CPE connected to the destination host. In the implementation, the first SRv6 packet may further specify a remote PE device in the provider network, that is, a SID list of the first SRv6 packet may further include a SID of the second PE device. In this way, the first SRv6 packet can be accurately forwarded out of the provider network. In another implementation, the SID list of the SRH may not include the SID of the first PE device, and an address of the first PE device is carried in a destination IP address field in the IPv6 header. In this way, a quantity of SIDs included in the SID list of the SRH can be reduced, and space occupied by the first SRv6 packet is effectively reduced.

According to a second aspect, the present disclosure further provides a packet processing method. The method is applied to a first PE device. For example, the method may include: The first PE device receives a first SRv6 packet sent by a first customer-side device that belongs to a first tenant, where the first SRv6 packet includes first indication information, and the first indication information indicates a first QoS requirement of the first tenant on a provider network. In this case, the first PE device processes the first SRv6 packet to obtain a second SRv6 packet. Next, the first PE device may select, based on the first indication information, a first path that meets the first QoS requirement to forward the second SRv6 packet, where an ingress node of the first path is the first PE device, an egress node of the first path is a second PE device, and a destination host of the first SRv6 packet is connected to the provider network by the second PE device. As can be seen, when a tenant has different QoS requirements for different traffic, for different traffic, indication information that meets a QoS requirement for the traffic can be autonomously selected, and an SRv6 packet that includes the indication information is obtained and sent to a PE device in a provider network, so that the PE device in the provider network can be aware of the QoS requirement of the tenant for the traffic, to provide, for the traffic, a service that meets the QoS requirement. Therefore, a tenant and a provider do not need to reach an agreement repeatedly for different traffic, and a provider network also does not need to establish a new SRv6 tunnel according to a newly added agreement, so that the provider network provides a flexible and friendly bearer service to the tenant, to improve use experience of the tenant regarding the bearer service of the provider network.

The first customer-side device may be a host, a CE device, or CPE. Similarly, the second customer-side device may be a destination host of the first tenant that the first SRv6 packet needs to reach or may be a CE device or CPE connected to the destination host, and the second customer-side device is connected to the provider network by the second PE. The first PE and the second PE belong to the provider network. The first SRv6 packet may include an address of the second customer-side device, to indicate the first SRv6 packet to pass through or reach the second customer-side device.

In an implementation, an outer destination IP address of the first SRv6 packet is a first IPv6 address, and the first IPv6 address is used for carrying the first indication information. In an example, the first IPv6 address belongs to a dedicated IPv6 address set (which may also be referred to as an IPv6 network segment) allocated by the first PE device to the first tenant. The dedicated IPv6 address set includes a plurality of IPv6 addresses, and each IPv6 address in the plurality of IPv6 addresses corresponds to a different QoS requirement of the first tenant. In another example, a Function field or an Argument field of the first IPv6 address is used for carrying the first indication information.

In another implementation, to simplify one-to-one configuration of a PE device connected to a customer-side device and the customer-side device one by one, a standard service code may be used as indication information. In other words, the provider network may agree with each tenant on a QoS requirement represented by the service code. The first SRv6 packet includes the first indication information, and the first indication information may be a service code corresponding to the first QoS requirement. In an example, an IPv6 extension header of the first SRv6 packet may carry the first indication information. In another example, a Traffic Class field in an IPv6 header of the first SRv6 packet may be used for carrying the first indication information. In a specific implementation, the first indication information is carried in the service code, and in particular, the first indication information is carried in the Traffic Class field, so that the PE device does not need to configure different SID addresses according to different QoS requirements of a tenant. Therefore, a workload of address allocation is reduced, and address space is also saved.

The first QoS requirement includes at least one of the following: a path overhead requirement, a latency requirement, a bandwidth requirement, a link jitter requirement, a bit error requirement, and a to-be-allocated fiber wavelength or timeslot requirement.

In an example, the method may further include: The first PE device locally stores a plurality of groups of configuration information including indication information and QoS requirements, where the plurality of groups of configuration information includes first configuration information, and the first configuration information indicates a correspondence between the first indication information and the first QoS requirement. In this case, that the first PE device selects, based on the first indication information, a first path that meets the first QoS requirement to forward the second SRv6 packet may include: The first PE device determines, based on the correspondence between the first indication information and the first QoS requirement indicated in the first configuration information, the first path that meets the first QoS requirement, to forward the second SRv6 packet based on the first path.

In the example, the first configuration information may be sent by the first PE device to the first customer-side device. The first PE device sends the first configuration information to the first customer-side device. For example, the first PE device may send the first configuration information to the first customer-side device through a provider management device and a service management device to which the first PE device belongs.

In another example, the method may further include: The first PE device may further locally store a plurality of groups of configuration information including indication information and paths, where the plurality of groups of configuration information includes second configuration information, and the second configuration information indicates a correspondence between the first indication information and the first path. In this case, that the first PE device selects, based on the first indication information, a first path that meets the first QoS requirement to forward the second SRv6 packet may include: The first PE device determines the first path based on the correspondence between the first indication information and the first path indicated in the second configuration information, to forward the second SRv6 packet based on the first path.

In still another example, the method may further include: The first PE device may further locally store a plurality of groups of configuration information including indication information and topology identifiers, where the plurality of groups of configuration information include third configuration information, the third configuration information indicates a correspondence between the first indication information and a topology identifier, the topology identifier identifies a network topology of a provider network, the network topology indicates a plurality of PE devices in the provider network, and the first tenant accesses the provider network through the plurality of PE devices. In this case, that the first PE device selects, based on the first indication information, a first path that meets the first QoS requirement to forward the second SRv6 packet may include: The first PE device determines, based on the third configuration information and in the network topology indicated by the topology identifier, the first path that meets the first QoS requirement, to forward the second SRv6 packet based on the first path.

In an implementation, the SID list in the SRH included in the first SRv6 packet may include a SID of the first PE device and a SID of the second customer-side device, the second customer-side device belongs to the first tenant, the second customer-side device is connected to the provider network by the second PE device, and the second customer-side device may be a destination host of the first SRv6 packet, or may be a CE device or CPE connected to the destination host. In the implementation, the first SRv6 packet may further specify a remote PE device in the provider network, that is, a SID list of the first SRv6 packet may further include a SID of the second PE device, and a destination host is connected to the provider network by the second PE device. In this way, the first SRv6 packet can be accurately forwarded out of the provider network. In another implementation, the SID list of the SRH may not include the SID of the first PE device, and an address of the first PE device is carried in a destination IP address field in the IPv6 header. In this way, a quantity of SIDs included in the SID list of the SRH can be reduced, and overheads of the first SRv6 packet are effectively reduced.

The first path may be a label-switched path (LSP) that performs multi-protocol label switching (MPLS)-based forwarding, an SRv6 tunnel, or a physical fiber link. Different types of paths correspond to different QoS requirements. The first PE device may perform, based on a determined type of the first path, encapsulation corresponding to the first path on the first SRv6 packet to obtain the second SRv6 packet, to forward the second SRv6 packet along the first path in the provider network, to provide a service that meets the first QoS requirement.

In an implementation, the method may further include: The first PE device receives a third SRv6 packet sent by the first customer-side device, where the third SRv6 packet includes second indication information, and the second indication information indicates a second QoS requirement of the first tenant on the provider network. The first PE device processes the third SRv6 packet to obtain a fourth SRv6 packet. The first PE device selects, based on the second indication information, a second path that meets the second QoS requirement to forward the fourth SRv6 packet. It can be learned that, when a same tenant has different QoS requirements for different traffic, for different traffic, a service that meets a QoS requirement for the traffic can be autonomously selected, so that the provider network provides a flexible and friendly bearer service to a same tenant.

In an implementation, the method may further include: The first PE device receives a fifth SRv6 packet sent by the third customer-side device of the second tenant, where the fifth SRv6 packet includes third indication information, and the third indication information indicates a third QoS requirement of the second tenant on the provider network. The first PE device processes the fifth SRv6 packet to obtain a sixth SRv6 packet. The first PE device PE selects, based on the third indication information, a third path that meets the third QoS requirement to forward the sixth SRv6 packet. It can be learned that, when different tenants have different QoS requirements for different traffic, for different traffic, each user can autonomously select a service that meets a QoS requirement for the traffic, so that the provider network provides a flexible and friendly bearer service to different tenants.

In an implementation, the first PE device may further locally store a plurality of groups of configuration information including identifiers of tenants and indication information, where the plurality of groups of configuration information include fourth configuration information, the fourth configuration information indicates a correspondence between an identifier of the first tenant and the first indication information, and the identifier of the first tenant may be an identifier of a virtual private network (VPN) to which the first tenant belongs or a virtual network identifier (VNI) of the first tenant, and uniquely identifies the first tenant. In this case, that the first PE device processes the first SRv6 packet to obtain a second SRv6 packet may include: processing the first SRv6 packet based on the fourth configuration information to obtain the second SRv6 packet, where the second SRv6 packet may carry, for example, the identifier of the first tenant, so that the remote PE device in the provider network can accurately send the received packet to a destination host that belongs to the first tenant.

In an implementation, the first PE device may further locally store a plurality of groups of configuration information including identifiers of tenants and interfaces, where the plurality of groups of configuration information includes fifth configuration information, and the fifth configuration information indicates a correspondence between a first interface of the first PE device and the identifier of the first tenant. In this case, that the first PE device receives a first SRv6 packet sent by a first customer-side device that belongs to a first tenant may include: The first PE device receives the first SRv6 packet from the first interface, and determines that the first SRv6 packet is from the first tenant. In this case, before the first PE device processes the first SRv6 packet to obtain a second SRv6 packet, the method may further include: determining whether the first indication information in the first SRv6 packet matches locally stored first indication information corresponding to the first tenant. In one case, if it is determined that the first indication information in the first SRv6 packet matches the locally stored first indication information corresponding to the first tenant, the first PE device processes the first SRv6 packet to obtain the second SRv6 packet. If it is determined that the first indication information in the first SRv6 packet does not match the locally stored first indication information corresponding to the first tenant, the first PE device may discard the first SRv6 packet and skip subsequent operations. In this way, the first PE device can accurately identify a valid packet that needs to be processed and forwarded, so that efficiency of packet processing is improved.

In an implementation, the method may further include: The first PE device provides a first service to the first tenant according to the first QoS requirement. In this way, the first PE device sends charging information to a charging server, where the charging information includes first statistical information of first traffic sent by the first tenant and fourth indication information, the fourth indication information is used for determining a first charging rule corresponding to the first service, and the first traffic includes the first SRv6 packet. In this way, the charging server can accurately perform targeted charging based on a service provided by the provider network to a tenant, so that experience of using the provider network by the tenant is improved.

In an implementation, the method may further include: The first PE device provides a second service to the first tenant according to the second QoS requirement. The first PE device sends second charging information to a charging server, where the second charging information includes second statistical information of second traffic sent by the first tenant and fifth indication information, the fifth indication information is used for determining a second charging rule corresponding to the second service, and the second traffic includes the third SRv6 packet.

In an implementation, the method may further include: The first PE device provides a third service to the second tenant according to the third QoS requirement. The first PE device sends third charging information to a charging server, where the third charging information includes third statistical information of third traffic sent by the second tenant and sixth indication information, the sixth indication information is used for determining a third charging rule corresponding to the third service, and the third traffic includes the fifth SRv6 packet.

It should be noted that for charging, the first PE device may send charging information to the charging server, and the charging server calculates fees generated when tenants connected to the first PE device use the provider network. Alternatively, the first PE device may calculate, based on the charging information, fees generated when tenants connected to the first PE device use the provider network, and then directly send the fees generated by the tenants to the charging server.

It should be noted that, for charging, the first PE device may not send a charging rule to the charging server, and charging rules corresponding to various services are configured on the charging server. The first PE device sends only a service used by each tenant and statistical information about use of the service to the charging server, and the charging server may query a corresponding charging rule to complete charging.

According to a third aspect, the present disclosure further provides a packet processing method. The method is applied to a first PE device. For example, the method may include: The first PE device receives a first SRv6 packet sent by a first customer-side device that belongs to a first tenant, where the first SRv6 packet includes first indication information, and the first indication information indicates a first quality of service QoS requirement of the first tenant on a provider network. In other words, the first indication information indicates a first transmission service type that the first tenant requests the provider network to provide or indicates a path that the first tenant requests the provider network to provide to the first tenant and that meets the first quality of service QoS requirement. The first PE device obtains, based on the first indication information, a first statistical result of first traffic that is in the received packet, that is from the first tenant, and that includes the first indication information, where the first statistical result indicates to determine, according to a first charging rule corresponding to the first indication information of the first tenant, a first fee generated by the first tenant.

The first statistical result includes at least one of the following: a quantity of packets or a quantity of bytes.

In an implementation, the method may further include: The first PE device sends the first statistical result to a charging server, where the first statistical result indicates the charging server to calculate the first fee. The charging server stores charging rules (including a first charging rule for the first traffic) corresponding to various services, to calculate the first fee according to the first charging rule and the first statistical information.

In another implementation, the method may further include: The first PE device determines the first fee based on the first statistical result and the first charging rule, and sends the first fee to a charging server. In this way, the charging server does not need to perform calculation, and directly uses the received first fee as a fee generated for the first traffic of the first tenant in the provider network.

According to a fourth aspect, the present disclosure further provides a charging system, including a first PE device and a charging server. The first PE device is configured to send charging information to the charging server, where the charging information includes first statistical information of first traffic sent by a first tenant and fourth indication information, the fourth indication information is used for determining a first charging rule corresponding to a first service, and the first traffic includes a first SRv6 packet. The charging server is configured to determine, based on the charging information, a fee generated when the first tenant transmits the first traffic in a provider network.

It should be noted that, for related descriptions and achieved effects of the charging system, refer to related descriptions in any embodiment of the charging in the second aspect and related descriptions in the third aspect.

According to a fifth aspect, the present disclosure further provides a packet processing apparatus. The apparatus is applied to a first customer-side device that belongs to a first tenant. The apparatus may include a first obtaining unit and a first sending unit. The first obtaining unit is configured to obtain a first segment routing over internet protocol version 6 SRv6 packet, where the first SRv6 packet includes first indication information, and the first indication information indicates a first quality of service QoS requirement of the first tenant on a provider network. The first sending unit is configured to send the first SRv6 packet to a first provider edge PE device.

In an implementation, the apparatus may further include a second obtaining unit and a second sending unit. The second obtaining unit is configured to obtain a second SRv6 packet, where the second SRv6 packet includes second indication information, and the second indication information indicates a second QoS requirement of the first tenant on the provider network. The second sending unit is configured to send the second SRv6 packet to the first PE device.

In an implementation, the apparatus may further include a third obtaining unit. The third obtaining unit is configured to: before the first SRv6 packet is obtained, obtain a correspondence between the first indication information and the first QoS requirement.

In an example, the third obtaining unit is specifically configured to receive configuration information sent by the first PE device, where the configuration information indicates the correspondence between the first indication information and the first QoS requirement.

In another example, the third obtaining unit is specifically configured to receive configuration information sent by a service management device, where the configuration information indicates the correspondence between the first indication information and the first QoS requirement.

In an implementation, the first SRv6 packet includes a segment routing header, a segment identifier list SID list of the SRH includes a SID of the first PE device and a SID of a second customer-side device, the second customer-side device belongs to the first tenant, the second customer-side device is connected to the provider network via a second PE device, and the second customer-side device may be a destination host of the first SRv6 packet, or may be a CE device or CPE connected to the destination host. In an example, the SID list may further include a SID of the second PE device. In another implementation, the SID list of the SRH may not include the SID of the first PE device, and an address of the first PE device is carried in a destination IP address field in the IPv6 header. In this way, a quantity of SIDs included in the SID list of the SRH can be reduced, and space occupied by the first SRv6 packet is effectively reduced.

According to a sixth aspect, the present disclosure further provides a packet processing apparatus. The apparatus is applied to a first provider edge PE device, and the apparatus may include a first receiving unit, a first processing unit, and a first sending unit. The first receiving unit is configured to receive a first segment routing over internet protocol version 6 SRv6 packet sent by a first customer-side device that belongs to a first tenant, where the first SRv6 packet includes first indication information, and the first indication information indicates a first quality of service QoS requirement of the first tenant on a provider network. The first processing unit is configured to process the first SRv6 packet to obtain a second SRv6 packet. The first sending unit is configured to select, based on the first indication information, a first path that meets the first QoS requirement to forward the second SRv6 packet, where an ingress node of the first path is the first PE device, an egress node of the first path is a second PE device, and a destination host of the first SRv6 packet is connected to the provider network by the second PE device.

In an implementation, the first SRv6 packet includes a segment routing header, a segment identifier list SID list of the SRH includes a SID of the first PE device and a SID of a second customer-side device, the second customer-side device belongs to the first tenant, the second customer-side device is connected to the provider network via a second PE device, and the second customer-side device may be a destination host of the first SRv6 packet, or may be a CE device or CPE connected to the destination host. In an example, the SID list may further include a SID of the second PE device. In another implementation, the SID list of the SRH may not include the SID of the first PE device, and an address of the first PE device is carried in a destination IP address field in the IPv6 header. In this way, a quantity of SIDs included in the SID list of the SRH can be reduced, and space occupied by the first SRv6 packet is effectively reduced.

The first path is an LSP that performs MPLS-based forwarding, an SRv6 tunnel, or a physical fiber link.

In an implementation, the apparatus may further include a second receiving unit, a second processing unit, and a second sending unit. The second receiving unit is configured to receive a third SRv6 packet sent by the first customer-side device, where the third SRv6 packet includes second indication information, and the second indication information indicates a second QoS requirement of the first tenant on the provider network. The second processing unit is configured to process the third SRv6 packet to obtain a fourth SRv6 packet. The second sending unit is configured to select, based on the second indication information, a second path that meets the second QoS requirement to forward the fourth SRv6 packet.

In an implementation, the apparatus may further include a third receiving unit, a third processing unit, and a third sending unit. The third receiving unit is configured to receive a fifth SRv6 packet sent by a third customer-side device of a second tenant, where the fifth SRv6 packet includes third indication information, and the third indication information indicates a third QoS requirement of the second tenant on the provider network. The third processing unit is configured to process the fifth SRv6 packet to obtain a sixth SRv6 packet. The third sending unit is configured to select, based on the third indication information, a third path that meets the third QoS requirement to forward the sixth SRv6 packet.

In an implementation, the apparatus may further include a first storage unit. The first storage unit is configured to locally store first configuration information, where the first configuration information indicates a correspondence between the first indication information and the first QoS requirement. The first sending unit is specifically configured to determine the first path based on the first configuration information. In an example, the apparatus may further include a fourth sending unit. The fourth sending unit is configured to send the first configuration information to the first customer-side device. In an example, the fourth sending unit is specifically configured to send the first configuration information to the first customer-side device through a provider management device and a service management device to which the first PE device belongs.

In another implementation, the apparatus may further include a second storage unit. The second storage unit is configured to locally store second configuration information, where the second configuration information indicates a correspondence between the first indication information and the first path. The first sending unit is specifically configured to determine the first path based on the second configuration information.

In an implementation, the apparatus may further include a third storage unit. The third storage unit is configured to locally store third configuration information, where the third configuration information indicates a correspondence between the first indication information and a topology identifier, the topology identifier identifies a network topology of the provider network, the network topology indicates a plurality of PE devices in the provider network, and the first tenant accesses the provider network through the plurality of PE devices. In this case, the first sending unit is specifically configured to determine, based on the third configuration information and in the network topology indicated by the topology identifier, the first path that meets the first QoS requirement.

In an implementation, the apparatus may further include a fourth storage unit. The fourth storage unit is configured to locally store fourth configuration information, where the fourth configuration information indicates a correspondence between an identifier of the first tenant and the first indication information, and the identifier of the first tenant may be an identifier of a VPN to which the first tenant belongs or a VNI of the first tenant, and uniquely identifies the first tenant. In this case, the first processing unit is specifically configured to process the first SRv6 packet based on the fourth configuration information to obtain the second SRv6 packet.

In an implementation, the apparatus may further include a fifth storage unit. The fifth storage unit is configured to locally store fifth configuration information, where the fifth configuration information indicates a correspondence between a first interface of the first PE device and the identifier of the first tenant. In this case, the first receiving unit is specifically configured to: receive the first SRv6 packet from the first interface, and determine that the first SRv6 packet belongs to the first tenant. The apparatus may further include: a determining unit configured to: before the first SRv6 packet is processed to obtain the second SRv6 packet, determine that the first indication information in the first SRv6 packet matches locally stored first indication information corresponding to the first tenant.

In an implementation, the apparatus may further include a first service unit and a fifth sending unit. The first service unit is configured to provide a first service to the first tenant according to the first QoS requirement. The fifth sending unit is configured to send charging information to a charging server, where the charging information includes first statistical information of first traffic sent by the first tenant and fourth indication information, the fourth indication information is used for determining a first charging rule corresponding to the first service, and the first traffic includes the first SRv6 packet.

In an implementation, the apparatus may further include a second service unit and a sixth sending unit. The second service unit is configured to provide a second service to the first tenant according to the second QoS requirement. The second service unit is configured to send second charging information to a charging server, where the second charging information includes second statistical information of second traffic sent by the first tenant and fifth indication information, the fifth indication information is used for determining a second charging rule corresponding to the second service, and the second traffic includes the third SRv6 packet.

In an implementation of the fifth aspect and the sixth aspect, an outer destination internet protocol IP address of the first SRv6 packet is a first internet protocol version 6 IPv6 address, and the first IPv6 address is used for carrying the first indication information. In an example, the first IPv6 address belongs to a dedicated IPv6 address set allocated by the first PE device to the first tenant. The IPv6 address set includes a plurality of IPv6 addresses, and each IPv6 address in the plurality of IPv6 addresses corresponds to a different QoS requirement of the first tenant. In another example, a Function field or an Argument field of the first IPv6 address is used for carrying the first indication information.

In another implementation of the fifth aspect and the sixth aspect, the first SRv6 packet includes the first indication information, and the first indication information is a service code corresponding to the first QoS requirement. In an example, an IPv6 extension header of the first SRv6 packet carries the first indication information. In another example, a Traffic Class field in an IPv6 header of the first SRv6 packet may carry the first indication information.

In an implementation of the fifth aspect and the sixth aspect, the first QoS requirement includes at least one of the following: a path overhead requirement, a latency requirement, a bandwidth requirement, a link jitter requirement, a bit error requirement, and a to-be-allocated fiber wavelength or timeslot requirement.

In an implementation of the fifth aspect and the sixth aspect, the first customer-side device may be a CE device, or the first customer-side device is CPE.

It should be noted that, for a specific implementation and achieved effects of the packet processing apparatus provided in the fifth aspect of the present disclosure, refer to related descriptions in the embodiment shown in the first aspect.

It should be noted that, for a specific implementation and achieved effects of the packet processing apparatus provided in the sixth aspect of the present disclosure, refer to related descriptions in the embodiment shown in the second aspect.

According to a seventh aspect, the present disclosure provides a communication apparatus. The communication apparatus includes a memory and a processor. The memory is configured to store program code. The processor is configured to run instructions in the program code, so that the communication apparatus performs the method according to any one of the first aspect and the implementations of the first aspect, or the communication apparatus performs the method according to any one of the second aspect and the implementations of the second aspect.

According to an eighth aspect, the present disclosure provides a communication system. The communication system includes a first PE device and a first customer-side device. The first PE device is configured to perform the method according to any one of the second aspect and the implementations of the second aspect. The first customer-side device is configured to perform the method according to any one of the first aspect and the implementations of the first aspect.

According to a ninth aspect, the present disclosure provides a computer-readable storage medium. The computer-readable storage medium stores instructions. When the instructions are run on a computer, the computer is enabled to perform the method according to any one of the first aspect and the implementations of the first aspect, or the computer is enabled to perform the method according to any one of the second aspect and the implementations of the second aspect.

According to a tenth aspect, the present disclosure provides a computer program product, including a program. When the program is run on a processor, the method according to any one of the first aspect and the implementations of the first aspect is implemented, or the method according to any one of the second aspect and the implementations of the second aspect is implemented.

DESCRIPTION OF EMBODIMENTS

Figure 1:
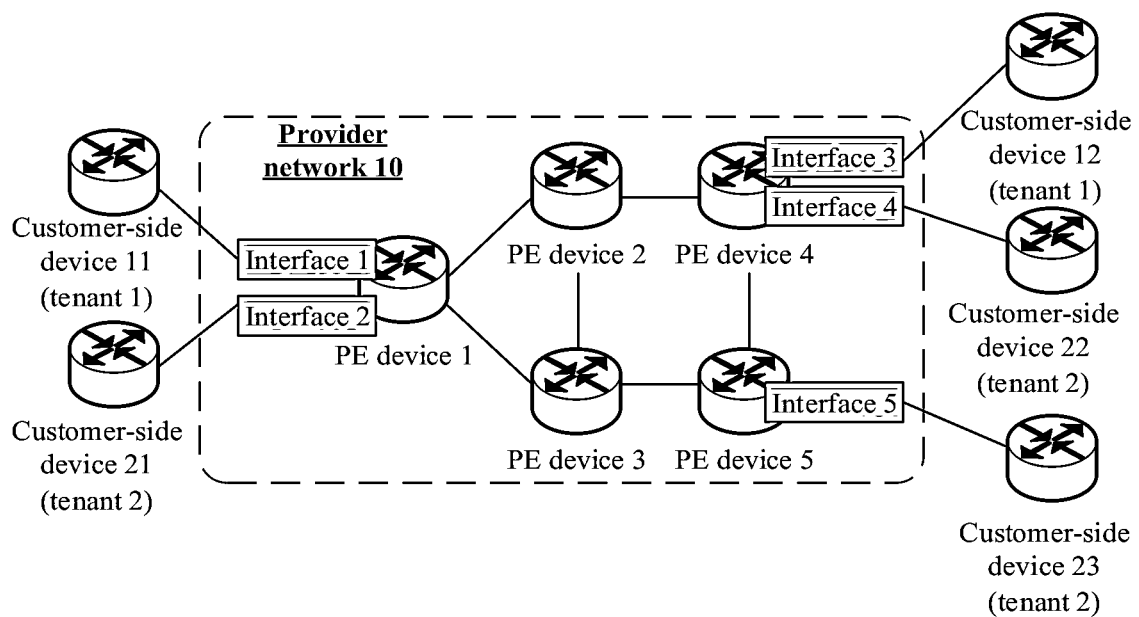
FIG. 1 is a schematic diagram of a network framework related to an application scenario according to an embodiment of the present disclosure.

The following describes technical solutions of embodiments in the present disclosure with reference to accompanying drawings. The network architecture and the service scenario described in embodiments of the present disclosure are intended to describe the technical solutions in embodiments of the present disclosure more clearly, and do not constitute a limitation on the technical solutions provided in embodiments of the present disclosure. A person of ordinary skill in the art may know that: With the evolution of the network architecture and the emergence of new service scenarios, the technical solutions provided in embodiments of the present disclosure are also applicable to similar technical problems.

Ordinal numbers such as "1", "2", "3", "first", "second", and "third" in the present disclosure are used to distinguish between a plurality of objects, but are not intended to limit a sequence of the plurality of objects.

It should be understood that "A and/or B" mentioned in the present disclosure includes the following cases: Only A is included, only B is included, or both A and B are included.

Generally, when traffic of a tenant is sent from one customer-side device to another customer-side device of the tenant, the traffic needs to be forwarded through a provider network, and the provider network provides a bearer service for the traffic of the tenant. Currently, a tenant and a provider network agree on a service class by signing a contract or in other forms, and the provider network provides a corresponding service to the tenant based on the agreed service class. Specifically, an SRv6 tunnel is established in a provider network. After traffic of a tenant reaches a PE device in the provider network, the PE device may direct the traffic to an SRv6 tunnel corresponding to a pre-agreed service class. Forwarding the traffic through the SRv6 tunnel can enable the provider network to provide a service that meets the pre-agreed service class to the tenant.

However, in many scenarios, a tenant requires a provider network to provide a service of a service class different from an agreed service class for some traffic. In this case, in the foregoing manner in which the provider network provides a specific bearer service for traffic of the tenant according to an agreement, the provider network cannot provide a service that does not comply with the agreed service class for different traffic of the tenant, which is not flexible and friendly to the tenant. For traffic that does not meet a pre-agreed service class requirement, a tenant may additionally agree on a service class corresponding to the traffic with a provider network by signing a contract or in other forms. A PE device on the provider network identifies the traffic and directs the traffic to an SRv6 tunnel that can meet a service class requirement of the traffic. In this way, although the provider network provides corresponding services for traffic with different service class requirements of the tenant, the tenant and the provider network need to make an additional agreement. In addition, the provider network needs to establish an SRv6 tunnel that meets the additional agreement. The process is complex, and it is difficult to meet a requirement of the tenant to independently select a bearer service of the provider network.

Based on this, an embodiment of the present disclosure provides a packet processing method. A customer-side device of a tenant can obtain SRv6 packets including different indication information. The different indication information indicates different QoS requirements of the tenant on a provider network, and the different QoS requirements correspond to different service classes. In addition, the customer-side device sends the SRv6 packet to a PE device in the provider network. In this way, when a tenant has different QoS requirements for different traffic, for different traffic, indication information that meets a QoS requirement for the traffic can be autonomously selected, and an SRv6 packet that includes the indication information is obtained and sent to a PE device in a provider network, so that the PE device in the provider network can be aware of the QoS requirement of the tenant for the traffic, to provide, for the traffic, a service that meets the QoS requirement. Therefore, a tenant and a provider do not need to reach an agreement repeatedly for different traffic, and a provider network also does not need to establish a new SRv6 tunnel according to a newly added agreement, so that the provider network provides a flexible and friendly bearer service to the tenant, to improve use experience of the tenant regarding the bearer service of the provider network.

The QoS requirement may include, but not limited to, at least one of the following: a path overhead requirement, a latency requirement, a bandwidth requirement, a link jitter requirement, a bit error requirement, and a to-be-allocated fiber wavelength or timeslot requirement.

For example, in a scenario shown in FIG. 1, a provider network 10 may include a PE device 1, a PE device 2, a PE device 3, a PE device 4, and a PE device 5. The PE device 1 is connected to a customer-side device 11 of a tenant 1 and a customer-side device 21 of a tenant 2 through an interface 1 and an interface 2, respectively. The PE device 4 is connected to a customer-side device 12 of the tenant 1 and a customer-side device 22 of the tenant 2 through an interface 3 and an interface 4, respectively. The PE device 5 is connected to a customer-side device 23 of the tenant 2 through an interface 5. The PE device 1 is connected to the PE device 4 by the PE device 2. The PE device 1 is connected to the PE device 5 through the PE device 3. The PE device 2 is connected to the PE device 3. The PE device 4 is connected to the PE device 5. It should be noted that provider (P) devices (which may also be referred to as core layer devices) may be used at locations of the PE device 2 and the PE device 3. In this embodiment of the present disclosure, only PE devices are used as an example for description.

Figure 2:
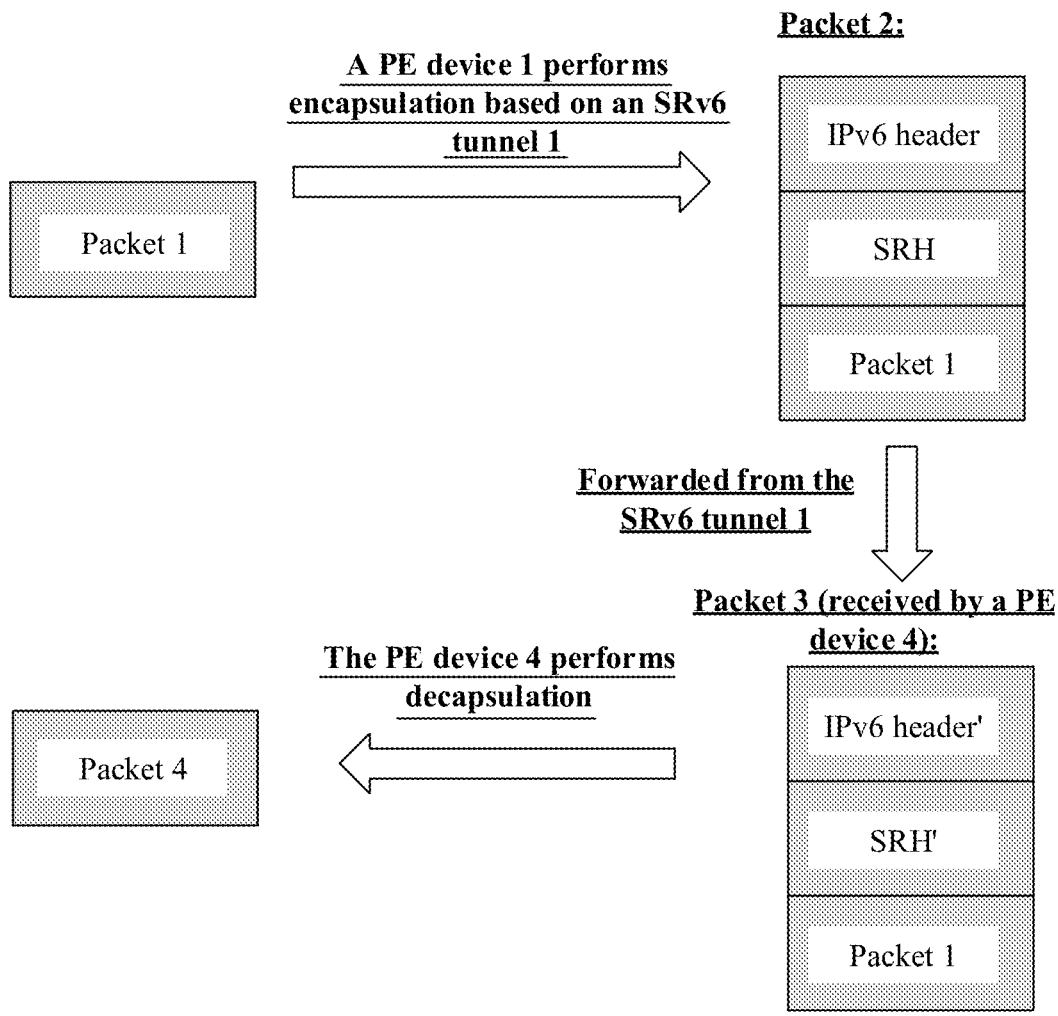
FIG. 2 is a schematic diagram of packet processing when a bearer service is provided in a provider network.

According to a current technical solution, the tenant 1 is used as an example. The provider network 10 may agree on a service class 1 with the tenant 1, and establish an SRv6 tunnel 1 that meets the service class 1. The SRv6 tunnel 1 sequentially passes through the PE device 1, the PE device 2, and the PE device 4. The customer-side device 11 receives a packet 1, and sends the packet 1 to the PE device 1 through the interface 1. The PE device 1 receives the packet 1 of the tenant 1, and forwards the packet 1 through the SRv6 tunnel 1. For example, the PE device 1 encapsulates the packet 1 based on the SRv6 tunnel 1 to obtain a packet 2, and sends the packet 2 from the SRv6 tunnel 1. The PE device 4 receives a packet 3 corresponding to the packet 2. The PE device 4 decapsulates the packet 3 to obtain a packet 4. For a schematic diagram, refer to FIG. 2. Therefore, the PE device 4 sends the packet 4 to the customer-side device 12 of the tenant 1 through the interface 3. In this way, the provider network 10 provides a service corresponding to the pre-agreed service class 1 to the tenant 1. However, if the tenant 1 requires the provider network 10 to provide a service of a service class 2 for traffic with a specific feature, and the service class 2 is different from the service class 1, the provider network 10 needs to agree on the service class 2 with the tenant 1, and establish an SRv6 tunnel 2 that meets the service class 2. The SRv6 tunnel 2 sequentially passes through the PE device 1, the PE device 3, the PE device 2, and the PE device 4. For example, the traffic includes a packet 1'. In this case, the customer-side device 11 receives the packet 1', and sends the packet 1' to the PE device 1 through the interface 1. The PE device 1 receives the packet 1' of the tenant 1, encapsulates the packet 1' based on the SRv6 tunnel 2 to obtain a packet 2', and forwards the packet 2' through the SRv6 tunnel 2. The PE device 4 receives a packet 3'. Therefore, the PE device 4 decapsulates the packet 3' to obtain a packet 4', and sends the packet 4' to the customer-side device 12 of the tenant 1 through the interface 3.

In this way, according to a target technical solution, after complex operations are performed on the provider network 10, although a service corresponding to the pre-agreed service class 2 is provided to the tenant 1, the tenant still cannot autonomously and flexibly select a service for traffic. For example, at a moment T1, the tenant 1 requires the provider network 10 to provide the service corresponding to the service class 1 for traffic with a feature 1, and provide the service corresponding to the service class 2 for traffic with a feature 2. At a moment T2, the provider network 10 needs to provide the service corresponding to the service class 2 for the traffic with the feature 1, and provide the service corresponding to the service class 1 for the traffic with the feature 2. This cannot be implemented according to a current technical solution.

According to the technical solution provided in this embodiment of the present disclosure, in the scenario shown in FIG. 1, the PE devices in the provider network 10 support SRv6, and the customer-side devices of the tenants also need to support SRv6. The tenant 1 is used as an example. An SRv6 domain of the tenant 1 is extended from a network including the PE device 1 to the PE device 5 to a network including the PE device 1 to the PE device 5, the customer-side device 11, and the customer-side device 12. The provider network 10 provides a plurality of paths of different types, for example, may include: an LSP that performs MPLS-based forwarding, an IPv6 tunnel, an SRv6 tunnel, or a physical fiber link, and different types of paths correspond to different QoS requirements.

Before packet processing is performed, the customer-side device of the tenant and the PE device that is used by the customer-side device to connect to the provider network 10 may obtain configuration information. The configuration information indicates QoS requirements corresponding to different indication information, so that the tenant can autonomously select a corresponding bearer service according to a QoS requirement. In an example, a PE device connected to a customer-side device of a tenant in the provider network 10 may configure related configuration information for tenants connected to the PE device, and send configuration information of the tenants to the customer-side device of the tenant. That the PE device sends the configuration information to the customer-side device may be that the PE device directly sends the configuration information to the customer-side device, or may be that the PE device indirectly sends the configuration information to the customer-side device through a provider management device and a service management device to which the PE device belongs. In another example, a provider management device or a service management device may configure related configuration information for a tenant, and send the configuration information to a customer-side device of the tenant and a PE device connected to the customer-side device of the tenant. In still another example, both a customer-side device of a tenant and a PE device connected to the customer-side device may obtain related configuration information in a static configuration manner, provided that same configuration information indicates same content. The following uses an example in which related configuration information is configured on a PE device and the configuration information is directly sent to a customer-side device for description.

For configuration information, in one case, the configuration information may include a correspondence between indication information and a path in a provider network, and different paths meet different QoS requirements. In another case, the configuration information may include a correspondence between indication information and a QoS requirement. The indication information may be an IPv6 address in a dedicated IPv6 address set (which may also be referred to as an IPv6 address block or an IPv6 network segment) allocated to a tenant; or may be a service code carried in a Function field or an Argument field based on a dedicated IPv6 address set allocated to a tenant; or may be a service code unrelated to a dedicated IPv6 address set allocated to a tenant. During specific implementation, when configuration information is known, a customer-side device of a tenant may select, according to a QoS requirement for traffic, corresponding indication information for a packet that belongs to the traffic, add the indication information to the packet, encapsulate the packet by using an SRv6 tunnel, and send an obtained SRv6 packet including the indication information to a PE device in a provider network connected to the customer-side device. The PE device parses the received SRv6 packet to obtain the indication information, determines a path according to the QoS requirement corresponding to the indication information, and further encapsulates the SRv6 packet based on a determined type of the path and forwards the SRv6 packet along the path. In this way, the provider network can accurately sense the QoS requirement of the tenant for the packet, and provide, for the packet of the tenant, a service that meets the QoS requirement, so that experience of using a bearer service of the provider network by the tenant is improved.

In the scenario shown in FIG. 1, the PE device 1 may pre-configure an IPv6 address set 2001:db8:A1::/48 for the tenant 1, and pre-configure an IPv6 address set 2001:db8:A2::/48 for the tenant 2.

In some possible implementations, the indication information is an IPv6 address in an IPv6 address set of the tenant, the configuration information includes the indication information and a QoS requirement, and the configuration information on the PE device 1 may include:

Configuration information 1: (tenant 1, IPv6 address 11=2001:db8:A1::1, QoS requirement 11<transmission path=path with minimum overheads>)

Configuration information 2: (tenant 1, IPv6 address 12=2001:db8:A1::2, QoS requirement 12<transmission path=path with minimum latency>)

Configuration information 3: (tenant 1, IPv6 address 13=2001:db8:A1::3, QoS requirement 13<transmission path=path with an exclusive fiber wavelength or timeslot>)

Configuration information 4: (tenant 2, IPv6 address 21=2001:db8:A2::1, QoS requirement 21<transmission path=path with minimum latency>)

Configuration information 5: (tenant 2, IPv6 address 22=2001:db8:A2::2, QoS requirement 22<transmission path=path with minimum link jitter>)

A specific example of configuring the configuration information on the PE device 1 may be as follows:

```
##Configure IPv6 address sets, IPv6 addresses,
and corresponding QoS requirements (also
called transport service type trans-service type)
and descriptions for the tenants.
Segment-routing ipv6
--locator as1 ipv6-prefix 2001:db8:A1::/48 binding
vrf1 ##an address set is bound to vrf1 (that
is, tenant 1);
        ----trans-service type 11 address 2001:db8:A1::1
description "minimum overheads"
        ----trans-service type 12 address 2001:db8:
A1::2 description "minimum latency"
        ----trans-service type 13 address 2001:db8:A1::3
description "exclusive fiber wavelength or timeslot"
--locator as2 ipv6-prefix 2001:db8:A2::/48 binding vrf2
##an address set is bound to vrf2 (that is, tenant 2);
        ----trans-service type 21 address 2001:db8:A2::1
description "minimum latency"
        ----trans-service type 22 address 2001:db8:A2::2
description "minimum link jitter"
```

It should be noted that the configuration information on the PE device 1 may be sent to a customer-side device of a corresponding tenant in an offline manner or in a protocol packet manner.

In addition, the PE device 1 may further configure, for example, the following information:

```
##Configure interfaces for connecting the tenants.
    interface ge1/0/1
        --ip binding vpn-instance vrf1 ##the interface
    1 is bound to vrf1 (that is, tenant 1), and
    the interface 1 is connected to the customer-side device 11
        interface ge1/0/2
        --ip binding vpn-instance vrf2 ##the interface
    2 is bound to vrf2 (that is, tenant 2), and
    the interface 2 is connected to the customer-side device 21
    ##configured to advertise IPV6 address sets to the tenants
    Isis 10 vpn-instance vrf1
        --segment-routing ipv6 locator as1 ##release an IPV6
    address set of as1 to a network of the tenant 1 in a VPN instance
    Isis 20 vpn-instance vrf2
        --segment-routing ipv6 locator as2 ##release an IPV6
    address set of as2 to a network of the tenant 2 in a VPN instance
```

It should be noted that a binding relationship between each interface and a tenant is configured on the PE device 1. When an interface used by the PE device 1 to receive a packet does not match a tenant to which the packet belongs, the PE device 1 may discard the packet. Conversely, when an interface used by the PE device 1 to receive a packet matches a tenant to which the packet belongs, the PE device 1 may process the packet according to the method provided in this embodiment of the present disclosure. In this way, a to-be-processed packet can be determined through the binding relationship before packet processing, so that accuracy of packet processing is improved.

It should be noted that the IPv6 address set that is configured on the PE device 1 and that needs to be advertised to the tenants may be sent to a customer-side device of a corresponding tenant through a protocol packet (for example, an intermediate system to intermediate system (ISIS) packet), so that a route between the customer-side device and the PE device 1 is reachable.

The PE device 1 may send the configuration information 1 to 3 to the customer-side device 11, and send the configuration information 4 and 5 to the customer-side device 21.

In an example, when a service 1 (for example, a Web file transfer service) of the tenant 1 has the QoS requirement 11 (that is, a path with minimum overheads is selected for forwarding), the customer-side device 11 may determine, based on the configuration information 1, that the IPv6 address 11 (that is, 2001:db8:A1::1) is filled as the destination IP address in a to-be-sent SRv6 packet 1. When receiving, from the interface 1 connecting the tenant 1, the SRv6 packet 1 including 2001:db8:A1::1, the PE device 1 may determine, based on the destination IP address 2001:db8: A1::1 of the SRv6 packet 1, that the QoS requirement 11 required by the SRv6 packet 1 is to select a path 1 with minimum overheads, and the path 1 sequentially passes through the PE device 1, the PE device 2, and the PE device 4. Therefore, the PE device 1 may process the SRv6 packet 1 based on the path 1 corresponding to the QoS requirement 11 to obtain the packet 2, and send the packet 2 to the PE device 4 based on the path 1. Then, the PE device 4 processes the received packet 3 corresponding to the packet 2 to obtain an SRv6 packet 4, and sends the SRv6 packet 4 to the customer-side device 12 through the interface 3. It should be noted that paths determined for SRv6 packets having different QoS requirements of the tenant 1 may pass through different network devices. For example, the QoS requirement 11 corresponds to the path 1 of the PE device 1, the PE device 2, and the PE device 4, and the QoS requirement 12 corresponds to a path 2 of the PE device 1, the PE device 2, the PE device 3, the PE device 5, and the PE device 4. Alternatively, paths determined for SRv6 packets having different QoS requirements of the tenant 1 may pass through a same network device, but types of the paths are different. For example, both the QoS requirement 11 and the QoS requirement 12 correspond to the path 1 of the PE device 1, the PE device 2, and the PE device 4, but the path 1 corresponding to the QoS requirement 11 is an LSP that performs MPLS-based forwarding, and the path 1 corresponding to the QoS requirement 12 is an SRv6 tunnel.

In another example, when a service 2 (for example, a voice or video call service) of the tenant 2 has the QoS requirement 22 (that is, a path with minimum link jitter is selected for forwarding), the customer-side device 21 may determine, based on the configuration information 5, that the IPv6 address 22 (that is, 2001:db8:A2::2) is filled as the destination IP address in a to-be-sent SRv6 packet 5. When receiving, from the interface 2 connecting the tenant 2, the SRv6 packet 5 including 2001:db8:A2::2, the PE device 1 may determine, based on the destination IP address 2001: db8:A2::2 of the SRv6 packet 5, that the QoS requirement 22 required by the SRv6 packet 5 is to select a path 2 with minimum link jitter, and the path 2 sequentially passes through the PE device 1, the PE device 3, and the PE device 5. Therefore, the PE device 1 may process the SRv6 packet 5 based on the path 2 corresponding to the QoS requirement 22 to obtain the packet 6, and send the packet 6 to the PE device 5 based on the path 2. Then, the PE device 5 processes the received packet 7 corresponding to the packet 6 to obtain the SRv6 packet 8, and sends the SRv6 packet 8 to the customer-side device 23 through the interface 5.

It should be noted that, in the foregoing two examples, the SRv6 packet 1 and the SRv6 packet 5 may further specify a destination address of a customer-side device in a SID list of the SRH. For example, the SRv6 packet 1 may further include an address of the customer-side device 12, and the SRv6 packet 5 may further include an address of the customer-side device 23. For example, the address of the customer-side device may be carried in a segment identifier list (SID list) field of a segment routing header (SRH) in the SRv6 packet. The customer-side device 12 is used as an example. The customer-side device 12 may be a destination host, a customer edge (CE) device, or CPE. If the customer-side device 12 is a CE device or CPE, a destination address of the customer-side device specified in the SRv6 packet 1 may be an address of the CE device or the CPE, for example, may be a 128-bit SRv6 SID, or may be a compressed SRv6 SID or IPv6 address less than 128 bits, for example, may be compressed by using draft-cl-spring-generalized-srv6-for-cmpr-3. If the customer-side device 12 is a destination host, the destination address of the customer-side device specified in the SRv6 packet 1 may be an address of the destination host, for example, may be an IPv6 address of the destination host.

In the implementation, in a case in which the provider network includes only one PE device connected to the customer-side device of the tenant in addition to the PE device 1, the configuration information may not specify a remote PE device in the provider network 10. The PE device 1 may directly determine that the remote PE device is another PE device of the tenant. For example, the PE device 1 may directly determine, for the SRv6 packet 1 of the tenant 1, that the remote PE device is the PE device 4. For a case in which the provider network includes at least two PE devices connected to the customer-side device of the tenant in addition to the PE device 1, the PE device 1 may search for and determine a next hop of the PE device 1 based on a next-hop SID of a SID of the PE device 1 in the SID list field of the SRH of the SRv6 packet, and use the next hop as a remote PE device. For example, for the SRv6 packet 5 of the tenant 2, based on the next-hop SID of the SID of the PE device 1 (that is, a SID of the customer-side device 23) in the SID list of the SRH of the SRv6 packet 5, the PE device 1 finds that the next hop of the PE device 1 when the PE device 1 reaches the customer-side device 23 is the PE device 5, so that it is determined that the PE device 5 is a remote PE device.

Alternatively, the remote PE device in the provider network 10 may be further specified in the configuration information. For example, the configuration information on the PE device 1 may include:

Configuration information 1': (tenant 1, IPv6 address 11=2001:db8:A1::1, remote PE device=PE device 4, QoS requirement 11<transmission path=path with minimum overheads>)

Configuration information 2': (tenant 1, IPv6 address 12=2001:db8:A1::2, remote PE device=PE device 4, QoS requirement 12<transmission path=path with minimum latency>)

Configuration information 3': (tenant 1, IPv6 address 13=2001:db8:A1::3, remote PE device=PE device 4, QoS requirement 13<transmission path=path with an exclusive fiber wavelength or timeslot>)

Configuration information 4': (tenant 2, IPv6 address 21=2001:db8:A2::1, remote PE device=PE device 4, QoS requirement 21<transmission path=path with minimum latency>)

Configuration information 4': (tenant 2, IPv6 address 23=2001:db8:A2::3, remote PE device=PE device 5, QoS requirement 23<transmission path=path with minimum latency>)

Configuration information 5': (tenant 2, IPv6 address 22=2001:db8:A2::2, remote PE device=PE device 5, QoS requirement 22<transmission path=path with minimum link jitter>)

Configuration information 5'': (tenant 2, IPv6 address 24=2001:db8:A2::4, remote PE device=PE device 4, QoS requirement 24<transmission path=path with minimum link jitter>)

A specific example of configuring the configuration information on the PE device 1 may be as follows:

```
##Configure IPv6 address sets, IPv6 addresses, and
corresponding QoS requirements (also
called transport service type trans-service
type) and descriptions for the tenants.
Segment-routing ipv6
--locator as1 ipv6-prefix 2001:db8:A1::/48 binding vrf1
##an address set is bound to vrf1 (that is, tenant 1);
        ----trans-service type 11 address 2001:db8:A1::1
dest<PE device 4> description "minimum overheads"
        ----trans-service type 12 address 2001:db8:A1::2
dest<PE device 4> description "minimum latency"
        ----trans-service type 13 address 2001:db8:A1::3
```

-continued

```
dest<PE device 4> description "exclusive fiber
wavelength or timeslot"
        --locator as2 ipv6-prefix 2001:db8:A2::/48 binding
vrf2 ##an address set is bound to vrf2 (that is, tenant 2);
        ----trans-service type 21 address 2001:db8:A2::1
dest<PE device 4> description "minimum latency"
        ----trans-service type 22 address 2001:db8:A2::2
dest<PE device 5> description "minimum link jitter"
        ----trans-service type 23 address 2001:db8:A2::3
dest<PE device 5> description "minimum latency"
        ----trans-service type 24 address 2001:db8:A2::4
dest<PE device 4> description "minimum link jitter"
```

In an example, when a service 1 of the tenant 1 has the QoS requirement 11, the customer-side device 11 may determine, based on the configuration information 1, that the TPv6 address 11 (that is, 2001:db8:A1::1) is filled as the destination TP address in a to-be-sent SRv6 packet 1. When receiving, from the interface 1 connecting the tenant 1, the SRv6 packet 1 including 2001:db8:A1::1, the PE device 1 may determine, based on the destination TP address 2001:db8:A1::1 of the SRv6 packet 1, that a remote PE device is the PE device 4, and determine that a path 1 with minimum overheads from the PE device 1 to the PE device 4 is selected for the SRv6 packet 1 in the provider network 10. Therefore, the PE device 1 may process the SRv6 packet 1 based on the path 1 corresponding to the QoS requirement 11 to obtain the packet 2, and send the packet 2 to the PE device 4 based on the path 1. Then, the PE device 4 processes the received packet 3 corresponding to the packet 2 to obtain an SRv6 packet 4, and sends the SRv6 packet 4 to the customer-side device 12 through the interface 3.

In another example, when a service 2 of the tenant 2 has the QoS requirement 22, the customer-side device 21 may determine, based on the configuration information 5, that the IPv6 address 22 (that is, 2001:db8:A2::2) is filled as the destination IP address in a to-be-sent SRv6 packet 5. When receiving, from the interface 2 connecting the tenant 2, the SRv6 packet 5 including 2001:db8:A2::2, the PE device 1 may determine, based on the destination IP address 2001:db8:A2::2 of the SRv6 packet 5, that the remote PE device is the PE device 5, and determine to select a path 2 with minimum link jitter from the PE device 1 to the PE device 5 in the provider network 10 for forwarding the SRv6 packet 5, and the path 2 sequentially passes through the PE device 1, the PE device 3, and the PE device 5. Therefore, the PE device 1 may process the SRv6 packet 5 based on the path 2 corresponding to the QoS requirement 22 to obtain the packet 6, and send the packet 6 to the PE device 5 based on the path 2. Then, the PE device 5 processes the received packet 7 corresponding to the packet 6 to obtain the SRv6 packet 8, and sends the SRv6 packet 8 to the customer-side device 23 through the interface 5.

Further alternatively, in a case in which the provider network further includes at least two PE devices connected to the customer-side device of the tenant in addition to the PE device 1, the configuration information may also not specify a remote PE device in the provider network 10, but instead specify a topology (which may also be referred to as a plane) including all PE devices of the tenant. The topology or plane in this embodiment of the present disclosure may be a multi-topology or a topology described in RFC 5120, or may be a set of paths calculated through a flexible algorithm (Flexalgo) described in draft-ietf-lsr-flex-algo-14. Alternatively, a set of forwarding sub-paths of a network resource may be further specified based on the foregoing topology or path set. These forwarding sub-paths belong to paths of the topology, but specify a timeslot of a network resource such as a network interface, for example, a virtual transport network (VTN) defined by draft-ietf-teas-enhanced-vpn-7. For example, in the scenario shown in FIG. 1, PE devices connected to the customer-side device of the tenant 2 include the PE device 1, the PE device 4, and the PE device 5. In this case, for example, configuration information corresponding to the tenant 2 may include:

Configuration information 6: (tenant 2, IPv6 address 25=2001:db8:A2::5, topology 1, QoS requirement 25)

Configuration information 7: (tenant 2, IPv6 address 26=2001:db8:A2::6, topology 2, QoS requirement 26)

Figure 3A:
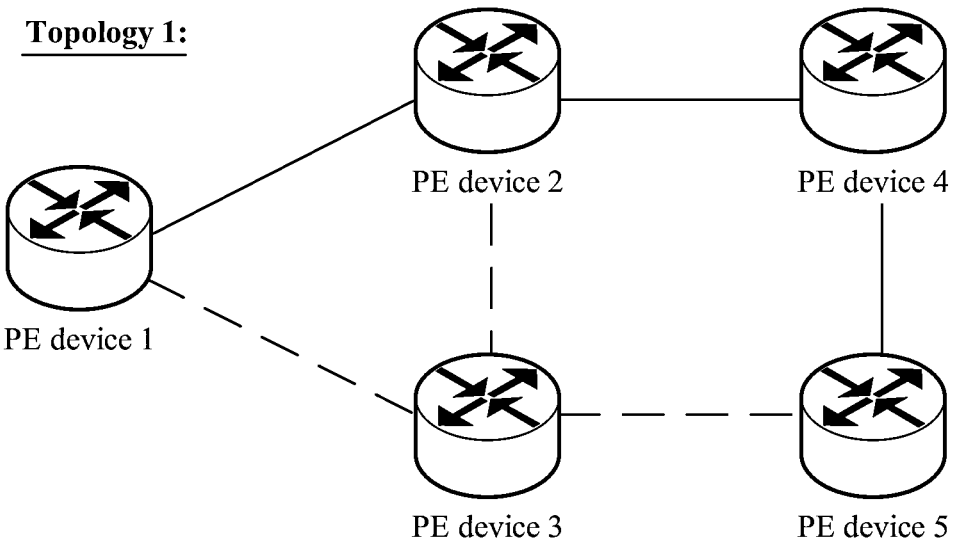
FIG. 3A is a schematic diagram of a structure of a topology 1 according to an embodiment of the present disclosure.
Figure 3B:
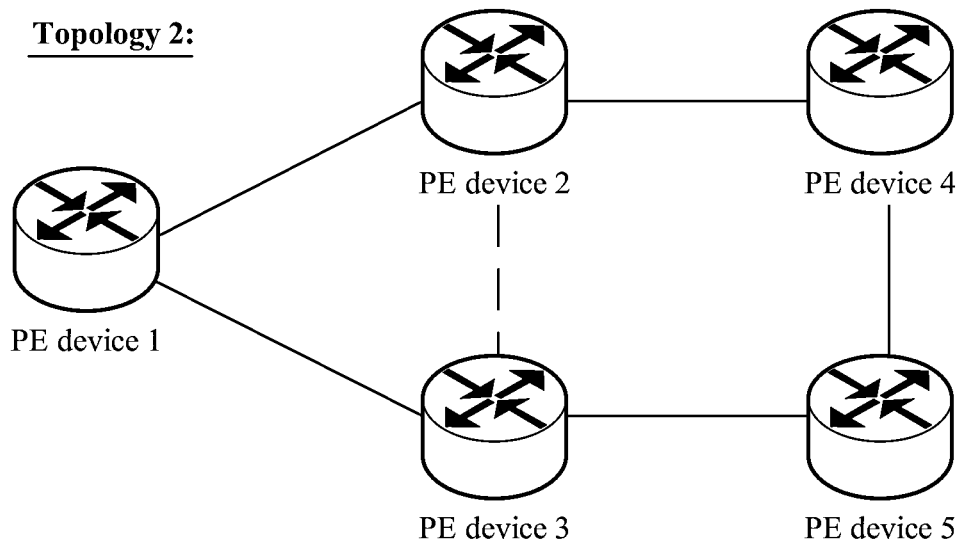
FIG. 3B is a schematic diagram of a structure of a topology 2 according to an embodiment of the present disclosure.

Refer to FIG. 3A for a schematic diagram of the topology 1, including: a PE device 1, a PE device 2, a PE device 4, a PE device 5, a link 1 between the PE device 1 and the PE device 2, a link 2 between the PE device 2 and the PE device 4, and a link 3 between the PE device 4 and the PE device 5, that is, parts connected by solid lines in FIG. 3A. The topology 1 may be used as a primary path of the configuration information 6, and parts connected by dashed lines may be used as an alternative topology to support the QoS requirement 25 of the configuration information 6 when the primary path is faulty. Similarly, refer to FIG. 3B for an example diagram of the topology 2, including: a PE device 1, a PE device 2, a PE device 3, a PE device 4, a PE device 5, a link 1 between the PE device 1 and the PE device 2, a link 2 between the PE device 2 and the PE device 4, a link 3 between the PE device 4 and the PE device 5, a link 4 between the PE device 1 and the PE device 3, and a link 5 between the PE device 3 and the PE device 5, that is, parts connected by solid lines in FIG. 3B. The topology 2 may be used as a primary path of the configuration information 7, and parts connected by dashed lines may be used as an alternative topology to support the QoS requirement 26 of the configuration information 7 when the primary path is faulty.

In an example, different IPv6 addresses may be configured in the provider network 10 for different topologies. For example, for a tenant 2, IPv6 addresses that correspond to the topology 1 and that are of the PE device 4 and the PE device 5 are respectively an address 1 and an address 2, and IPv6 addresses that correspond to the topology 2 and that are of the PE device 4 and the PE device 5 are respectively an address 3 and an address 4. In this case, when the PE device 1 receives a packet of the tenant 2, if a destination IP address field of the packet=the IPv6 address 25, the PE device 1 determines that the packet should be transmitted in the topology 1, and may determine that the address 1 or the address 2 that corresponds to the topology 1 is used as an address of the remote PE device.

In another example, in the provider network 10, different topology identifiers may be configured for different topologies, and the topology identifiers are carried in packets. For example, for the tenant 2, a topology identifier 1 is allocated to the topology 1, and a topology identifier 2 is allocated to the topology 2. In this case, when the PE device 1 receives a packet of the tenant 2, if a destination IP address field of the packet=the IPv6 address 25, or the packet carries the topology identifier 1, the PE device 1 determines that the packet should be forwarded along a path specified in the topology 1. Therefore, after the packet carries the topology identifier 1, the packet is forwarded along the path in the topology 1.

It should be noted that the remote PE device may be specified in the SRv6 packet 1 and the SRv6 packet 5, or the remote PE device may not be specified. Regardless of whether the remote PE device is specified in the SRv6 packet received by the PE device 1, if the PE device 1 configures a corresponding remote PE device for each piece of indication information, the PE device 1 may determine, based on locally stored configuration information (consistent with configuration information on the customer-side device), a remote PE device and a QoS requirement corresponding to the indication information in the SRv6 packet, to accurately forward a packet in the provider network 10, so that the provider network 10 provides a bearer service that meets a QoS requirement for a tenant.

It should be noted that, the remote PE device is specified in the configuration information. In one case, a configuration item of the remote PE device may be added to the configuration information. For example, the configuration information 1' includes a configuration item of "remote PE device=PE device 4". In another case, at least one bit in the indication information may be used to represent the remote PE device. For example, the indication information (that is, the IPv6 address) in the configuration information 1 is configured as 2001:db8:A1::14. "2001:db8:A1::1" indicates the QoS requirement 11, and "4" indicates that the remote PE device is the PE device 4.

An SRv6 packet 1 in the service 1 of the customer-side device 11 of the tenant 1 is used as an example to describe an example of a packet received and a packet sent by each device in the scenario shown in FIG. 1.

Figure 4A:
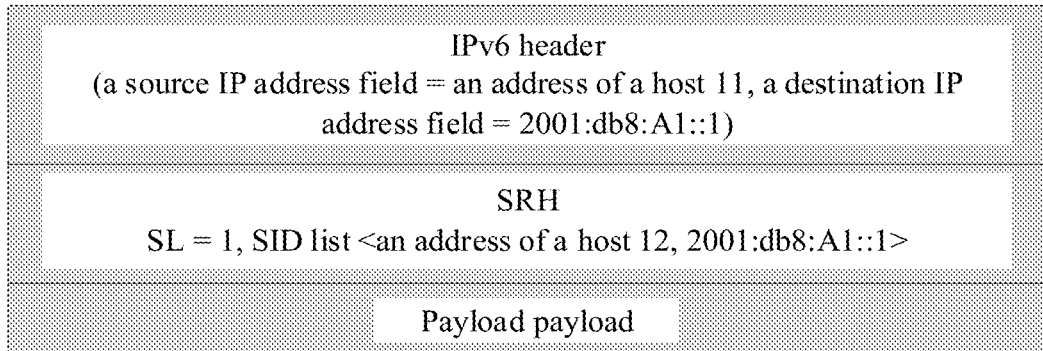
FIG. 4A is a schematic diagram of an SRv6 packet 1 according to an embodiment of the present disclosure.

For example, if the customer-side device 11 is a host 11 connected to the PE device 1, and the customer-side device 12 is a host 12 connected to the PE device 4, the host 11 may generate an SRv6 packet 1 (in practice, a native IPv6 packet to which an SRH is added as an IPv6 extension header) shown in FIG. 4A for the service 1. The SRv6 packet 1 includes an IPv6 header, an SRH, and a payload. In the IPv6 header, a source IP address field=an address of the host 11, the destination IP address field=the IPv6 address 11=2001: db8:A1::1, and the SRH includes a segment left (SL) field and a SID list field, the SL field=1, and the SID list includes the SID of the host 12 and 2001:db8:A1::1. It should be noted that the SRv6 packet 1 uses a non-reduced SRH packet encapsulation manner. When a destination address in an IPv6 header of the SRv6 packet 1 is 2001:db8:A1::1, a SID list in the SRH may not include 2001:db8:A1::1. Correspondingly, a value of an SL field is also decreased by 1. This manner is referred to as a reduced SRH packet encapsulation manner. In this embodiment of the present disclosure, an SRv6 packet in a non-reduced SRH packet encapsulation manner is used as an example for description.

Figure 4B:
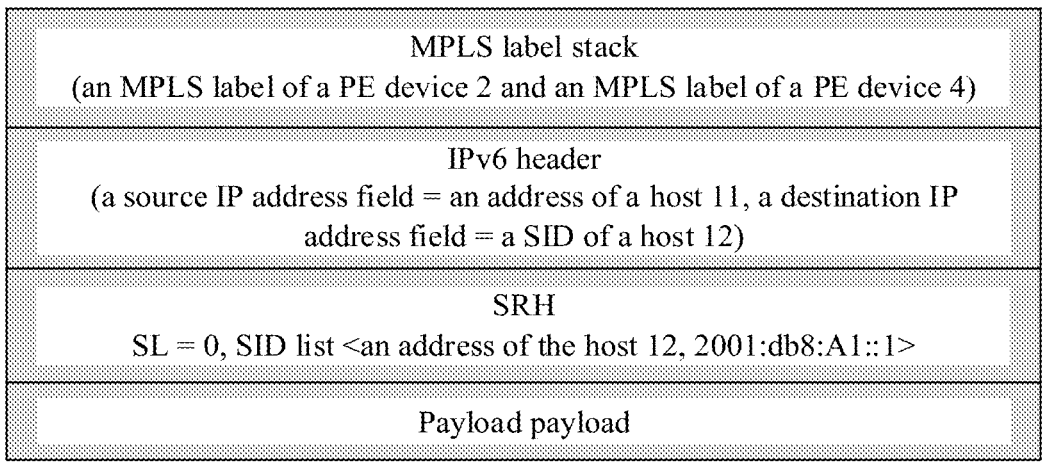
FIG. 4B is a schematic diagram of a packet 2 sent by a PE device 1 according to an embodiment of the present disclosure.
Figure 4C:
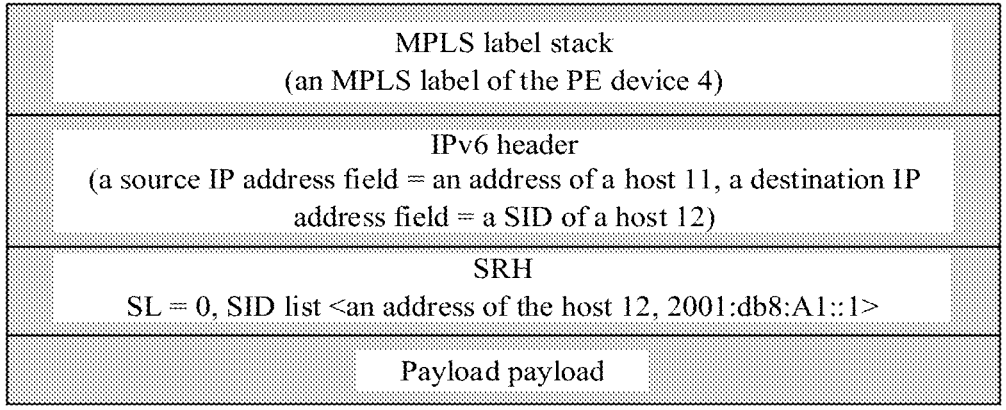
FIG. 4C is a schematic diagram of a packet 3 received by a PE device 4 according to an embodiment of the present disclosure.
Figure 4D:
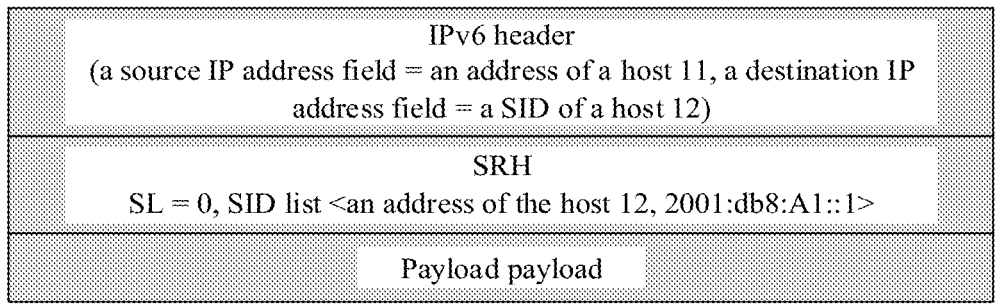
FIG. 4D is a schematic diagram of an SRv6 packet 4 according to an embodiment of the present disclosure.

When the SRv6 packet 1 is sent to the PE device 1, for the packet 2 obtained by the PE device 1 through processing, refer to FIG. 4B. In addition to the IPv6 header, the SRH, and the payload, the packet 2 further includes an MPLS label stack corresponding to the path 1 that meets the QoS requirement 11. The MPLS label stack is that the PE device 1 determines, by looking up routing entries, that a next hop to the host 12 is the PE device 4. In addition, it is determined that a path 1 that meets the QoS requirement 11 between the PE device 1 and the PE device 4 is an LSP that performs MPLS-based forwarding, to obtain an MPLS label stack corresponding to the path 1. The MPLS label stack may include, for example, an MPLS label of the PE device 2 and an MPLS label of the PE device 4. A source IP address field in an IPv6 header=an address of the host 11, a destination IP address field=a SID of the host 12, and an SL field in an SRH=0. The SID list includes the SID of the host 12 and 2001:db8:A1::1. In this way, the PE device 1 may forward the packet 2 to the PE device 4 through the path 1 based on the MPLS label stack of the packet 2. As shown in FIG. 4C, the PE device 4 receives a packet 3 corresponding to the packet 2. A difference from FIG. 4B lies in that the MPLS label stack includes only an MPLS label of the PE device 4. In this case, the PE device 4 may strip the MPLS label of the PE device 4 (that is, strip the MPLS label stack) to obtain an SRv6 packet 4. As shown in FIG. 4D, the SRv6 packet 4 includes an IPv6 header, an SRH, and a payload. In the IPv6 header, a source IP address field=an address of the host 11, a destination IP address field=a SID of the host 12, an SL field in the SRH=0, and a SID list includes the SID of the host 12 and 2001:db8:A1::1. In this case, the PE device 4 may send the SRv6 packet 4 to the host 12. It should be noted that, in the example, the host 11 may be directly connected to the PE device 1, or may be connected to the PE device 1 by another network device such as a switch or a router. If the host 11 is connected to the PE device 1 by another network device, the other network device performs only IPv6 forwarding on the SRv6 packet 1 without changing a destination address and an SRH of the SRv6 packet 1. Similarly, the host 12 may be directly connected to the PE device 4, or may be connected to the PE device 4 by another network device. If the host 12 is connected to the PE device 4 by another network device, the other network device performs only IPv6 forwarding to the host 12 on the SRv6 packet 4 without changing a destination address and an SRH of the SRv6 packet 4. In another optional method, when obtaining the packet 2 shown in FIG. 4B, the PE device 1 may strip the SRH based on an SL field=0 in the SRH. That is, the packet 2 sent by the PE device 1 may not carry the SRH. Correspondingly, the packets in FIG. 4C and FIG. 4D may also not carry the SRH.

Figure 5A:
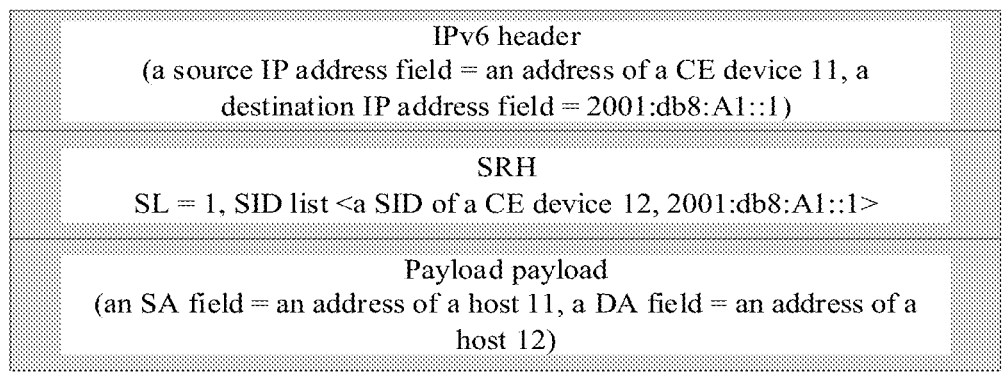
FIG. 5A is a schematic diagram of another SRv6 packet 1 according to an embodiment of the present disclosure.
Figure 5B:
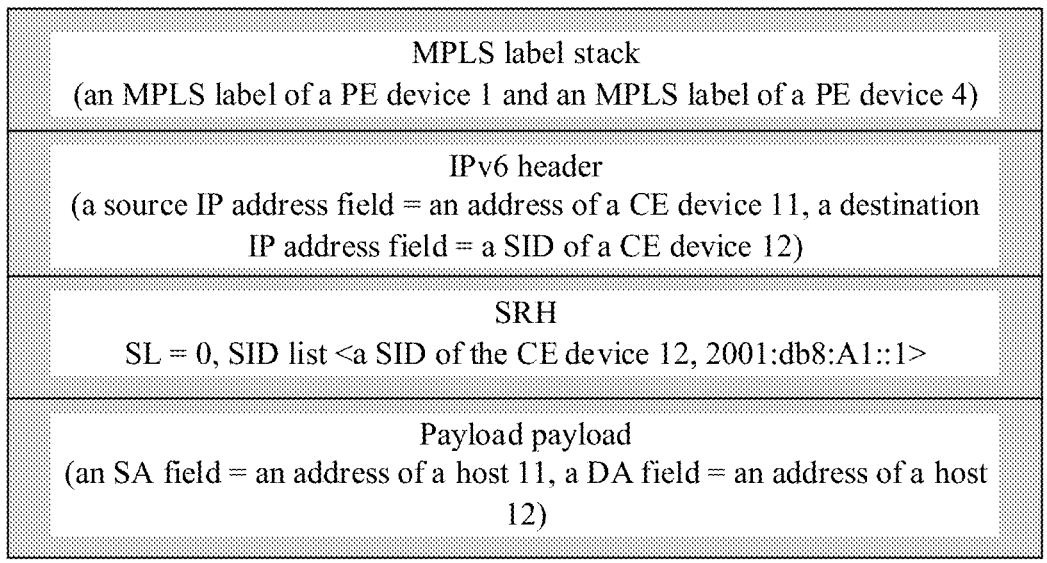
FIG. 5B is a schematic diagram of a packet 2 sent by another PE device 1 according to an embodiment of the present disclosure.
Figure 5C:
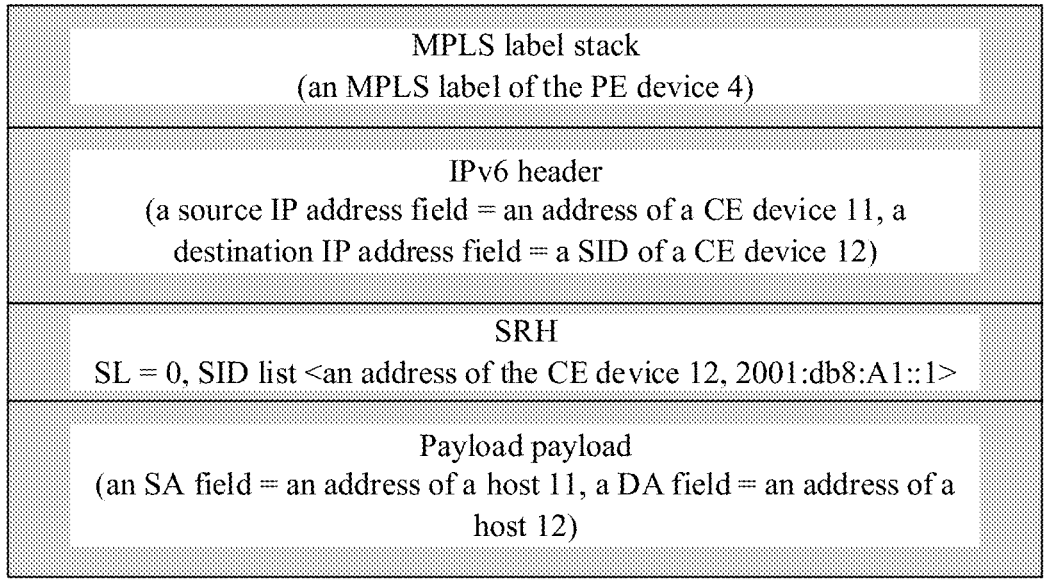
FIG. 5C is a schematic diagram of a packet 3 received by another PE device 4 according to an embodiment of the present disclosure.
Figure 5D:
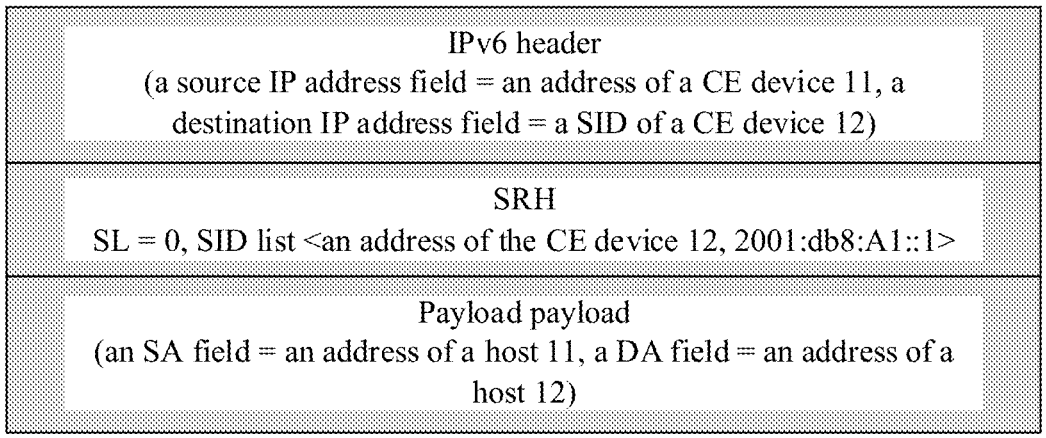
FIG. 5D is a schematic diagram of another SRv6 packet 4 according to an embodiment of the present disclosure.

In another example, if the customer-side device 11 is a CE device 11 such as a switch or a router, and the customer-side device 12 is a CE device 12 such as a switch or a router, the CE device 11 may process an SRv6 packet 1 of a service 1 received from the host 11, to obtain an SRv6 packet 1 (in practice a tunnel SRv6 tunnel packet) shown in FIG. 5A. The SRv6 packet 1 includes an IPv6 header, an SRH, and a payload. In the IPv6 header, a source IP address field=an address of the CE device 11, a destination IP address field=an IPv6 address 11=2001:db8:A1::1, an SL field in the SRH=1, a SID list includes a SID of the CE device 12 and 2001:db8:A1::1. The payload includes a source address (SA) field and a DA field. The SA field=an address of the host 11, and the DA field=an address of the host 12. When the SRv6 packet 1 is sent to the PE device 1, for a packet 2 obtained by the PE device 1 through processing, refer to FIG. 5B. In addition to the IPv6 header, the SRH, and the payload, the packet 2 further includes an MPLS label stack corresponding to the path 1 that meets the QoS requirement 11. For the MPLS label stack, refer to related descriptions in FIG. 4B. A source IP address field in the IPv6 header=an address of the CE device 11, and a destination IP address field=a SID of the CE device 12. The SL field in the SRH is 0, and the SID list includes the SID of the CE device 12 and 2001:db8:A1::1. In this way, the PE device 1 may forward the packet 2 to the PE device 4 through the path 1 based on the MPLS label stack of the packet 2. As shown in FIG. 5C, the PE device 4 receives a packet 3 corresponding to the packet 2. A difference from FIG. 5B lies in that the MPLS label stack includes only an MPLS label of the PE device 4. In this case, the PE device 4 may strip the MPLS label of the PE device 4 (that is, strip the MPLS label stack) to obtain an SRv6 packet 4. As shown in FIG. 5D, the SRv6 packet 4 includes an IPv6 header, an SRH, and a payload. In the IPv6 header, a source IP address field=an address of the CE device 11, a destination IP address field=a SID of the CE device 12, an SL field in the SRH=0, and a SID list includes the SID of the CE device 12 and 2001:db8:A1::1. In this case, the PE device 4 may send the SRv6 packet 4 to the CE device 12. In this case, the CE device 12 may perform SRv6 decapsulation on the SRv6 packet 4, and obtain, from the payload, a real destination address (that is, the host 12 indicated by the DA field) of the service packet sent by the host 1 of the tenant 1, to send the service packet to the host 12. It should be noted that, in the example, both the CE device 11 and the CE device 12 are required to support SRv6, and the CE device 11 sequentially passes through the PE device 1, the PE device 4, and the CE device 12 that belong to the SRv6 domain of the tenant 1.

Figure 6A:
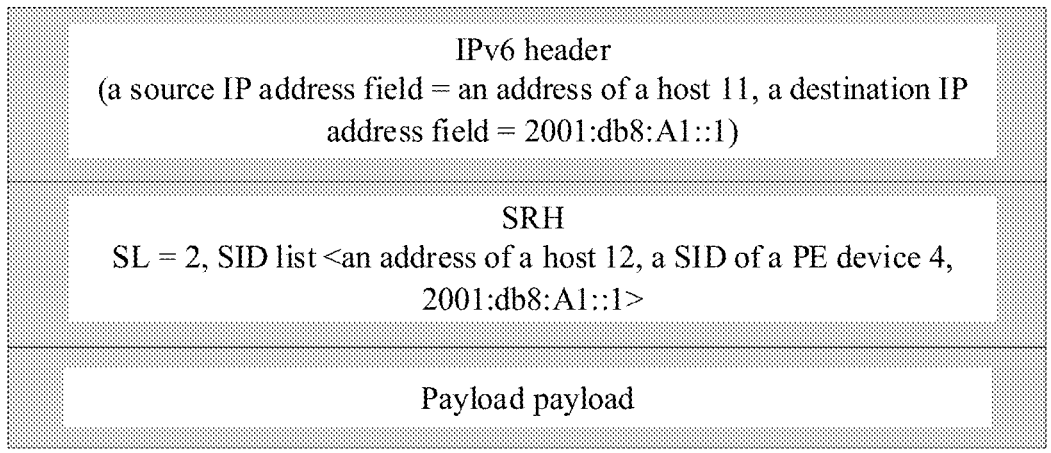
FIG. 6A is a schematic diagram of still another SRv6 packet 1 according to an embodiment of the present disclosure.
Figure 6B:
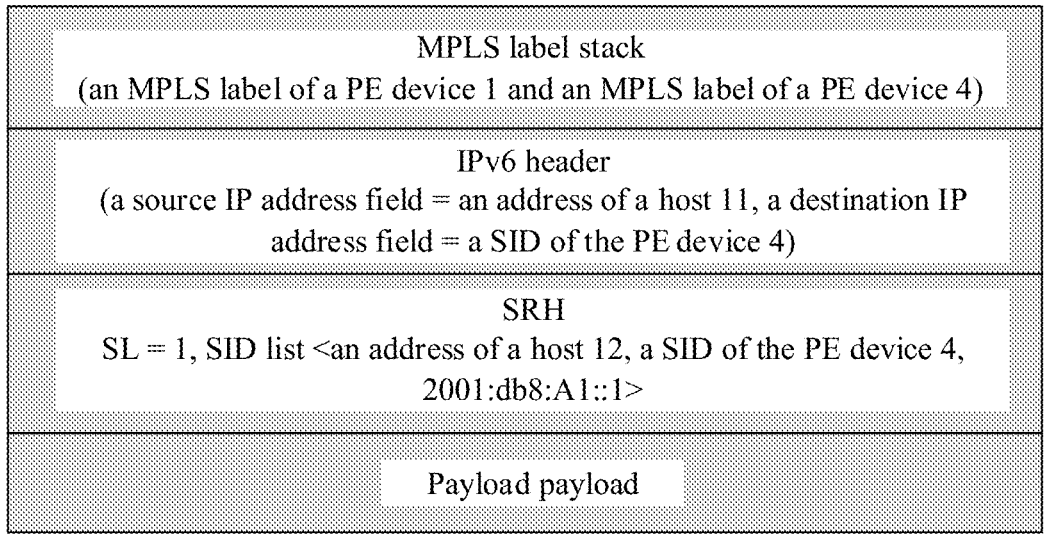
FIG. 6B is a schematic diagram of still another packet 2 according to an embodiment of the present disclosure.
Figure 6C:
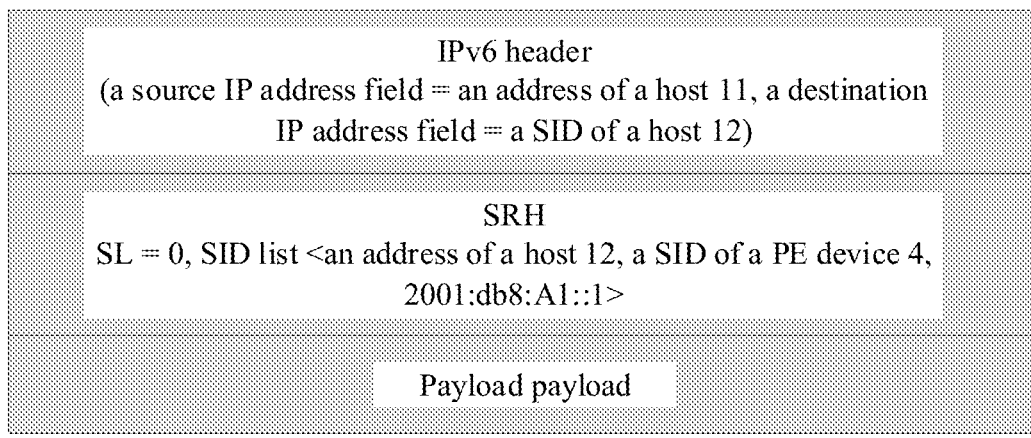
FIG. 6C is a schematic diagram of still another SRv6 packet 4 according to an embodiment of the present disclosure.

It should be noted that the SRv6 packets in the foregoing two examples are described by using an example in which the remote PE device is not specified. If the remote PE device is specified in the SRv6 packet, a difference lies in that a SID of the remote PE device and a value of the SL field are added to a SID list field of the SRH. An example in which the customer-side device 11 is the host 11 connected to the PE device 1 is used. In the SRv6 packet 1 received by the PE device 1, a destination IP address field in an IPv6 header=2001:db8:A1::1, an SL field of an SRH=2, and a SID list includes a SID of the host 12, a SID of the PE device 4, and 2001:db8:A1::1, as shown in FIG. 6A. Similarly, in the packet 2 sent by the PE device 1, a destination IP address field in the IPv6 header=the SID of the PE device 4, an SL field in the SRH=1, and the SID list includes the SID of the host 12, the SID of the PE device 4, and 2001:db8:A1::1, as shown in FIG. 6B. In the SRv6 packet 4 sent by the PE device 4, a destination IP address field in an IPv6 header=the SID of the host 12, an SL field in the SRH=0, and a SID list includes the SID of the host 12, the SID of the PE device 4, and 2001:db8:A1::1, as shown in FIG. 6C.

If the remote PE device is specified in the SRv6 packet, but the PE device 1 determines that the PE device by which the destination host of the SRv6 packet is connected to the provider network and the specified remote PE device are not a same PE device, the PE device 1 may discard the SRv6 packet.

In some other possible implementations, to simplify one-to-one configuration of a PE device connected to a customer-side device and the customer-side device one by one, a standard service code may be used as indication information. In other words, the provider network may agree with each tenant on a QoS requirement represented by the service code. For example, a service code 1 represents a path with minimum latency, a service code 2 represents a path with minimum overheads, and a service code 3 represents a path with minimum link jitter. Different tenants can use the same service code or different service codes according to QoS requirements. For example, if both a tenant 1 and a tenant 2 support service codes 1-3, it is equivalent to that the PE device 1 has the following configuration information:

Configuration information A: (tenant 1, IPv6 address set=2001:db8:A1::/48, supported service codes: 1, 2, and 3)
    Configuration information B: (tenant 2, IPv6 address 21=2001:db8:A2::/48, supported service codes: 1, 2, and 3)

In an example, the service code may be carried through low bits (for example, a function field or a parameter field) of an IPv6 address set allocated by the PE device to the tenant, and the IPv6 address set occupies high bits (that is, a locator field) of an IPv6 address. In this way, in the foregoing example in which the tenant 1 and the tenant 2 support the service codes 1 to 3, corresponding to an implementation in which the PE device 1 performs configuration for each tenant one by one, the PE device 1 needs to have a plurality of pieces of configuration information as follows:

(tenant 1, IPv6 address=2001:db8:A1::1, QoS requirement<transmission path=path with minimum latency>)

(tenant 1, IPv6 address=2001:db8:A1::2, QoS requirement<transmission path=path with minimum overheads>)

(tenant 1, IPv6 address=2001:db8:A1::3, QoS requirement<transmission path=path with minimum link jitter>)

(tenant 2, IPv6 address=2001:db8:A2::1, QoS requirement<transmission path=path with minimum latency>)

(tenant 2, IPv6 address=2001:db8:A2::2, QoS requirement<transmission path=path with minimum overheads>)

(tenant 2, IPv6 address=2001:db8 A2::3, QoS requirement<transmission path=path with minimum link jitter>)

It can be learned that the provider network and the tenant agree on a standard service code as the indication information, and the service code is carried through low bits in the IPv6 address set. This effectively simplifies configuration of the customer-side device and the PE device, and improves use experience of the tenant in using the provider network.

In another example, the service code may not be carried in the IPv6 address. In a packet sent by the tenant from the customer-side device, for example, the service code may be carried in an IPv6 extension header (for example, an SRH), and the PE device may determine, based on the service code in the packet, a QoS requirement corresponding to the service code, to notify the PE device of the QoS requirement of the tenant for forwarding the packet. In another example, the service code may be alternatively carried in a traffic class field in an IPv6 header. For the PE device, it is determined that an IPv6 address in an IPv6 header of a received SRv6 packet belongs to an IPv6 address set allocated by a tenant to the PE device, and the Traffic Class field is a service code agreed upon by the PE device and the tenant. The PE device may determine, based on the IPv6 address in the received SRv6 packet and the service code carried in the Traffic Class field, the QoS requirement of the tenant.

It can be learned that the provider network and the tenant agree on a standard service code as the indication information, and the service code is added to a packet sent to the provider network, so that the tenant can autonomously select a bearer service provided by the provider network without configuring the customer-side device and the PE device, and use experience of the tenant in using the provider network is improved.

It should be noted that, in this embodiment of the present disclosure, the provider network may be a service provider, a cloud provider, an organization such as an enterprise, and the provider network provides a bearer service to a plurality of tenants. The tenant may be an individual or an enterprise.

In the example of the scenario shown in FIG. 1, the provider network may be a service provider network, and the tenant may be an individual tenant. In this embodiment of the present disclosure, an enterprise tenant may use a service provider network and may also use a virtual private cloud (VPC) service provided by a cloud provider. The following describes embodiments of the present disclosure by using a scenario shown in FIG. 7.

Figure 7:
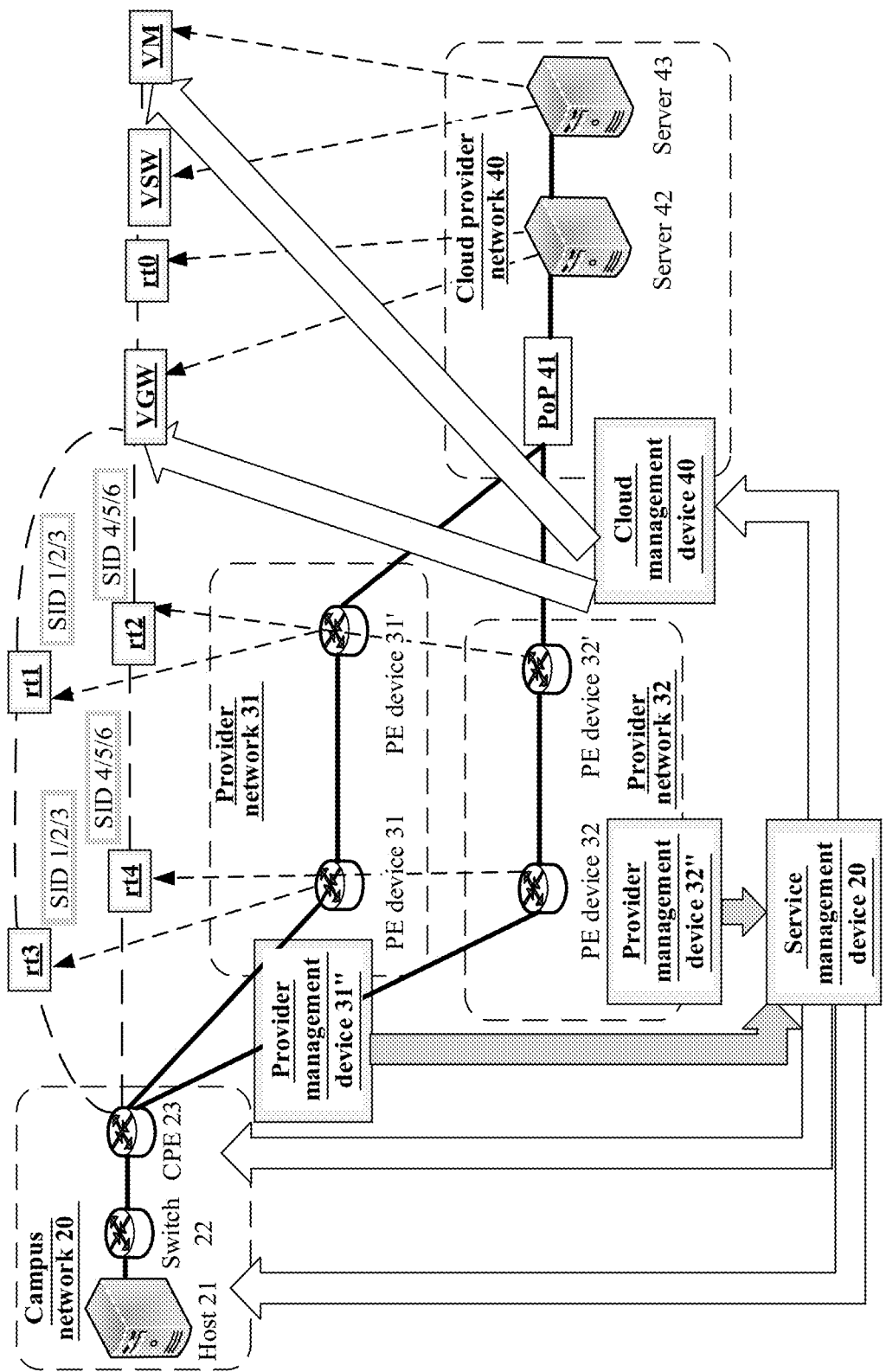
FIG. 7 is a schematic diagram of a network framework related to another application scenario according to an embodiment of the present disclosure.

In a scenario shown in FIG. 7, a campus network 20 of an enterprise X, a provider network 31, a provider network 32, and a cloud provider network 40 are included. The campus network 20 may include a host 21, a switch 22, and customer-premises equipment (CPE) 23. The provider network 31 includes a PE device 31 and a PE device 31'. The provider network 32 includes a PE device 32 and a PE device 32'. The cloud provider network 40 may include a point of presence (PoP) 41, a server 42, and a server 43. The host 21 is connected to the CPE 23 by the switch 22. The CPE 23 is connected to the provider network 31 and the provider network 32 by the PE device 31 and the PE device 32, respectively. The provider network 31 is connected to the PoP 41 of the cloud provider network 40 by the PE device 31'. The provider network 32 is connected to the PoP 41 of the cloud provider network 40 by the PE device 32'. The PoP 41 is connected to the server 43 by the server 42. The server 42 may be considered as a cloud PE device, and the server 43 may be considered as a cloud CE device.

The cloud provider network 40 may provide a VPC service to an enterprise X. From a perspective of the enterprise X, the devices in the cloud provider network 40 may be virtualized into a virtual host, a switch, a router, a gateway, and the like. For example, the server 42 is virtualized into a virtual gateway (VGW), and a virtual router rt0. The server 43 is virtualized into a virtual switch (VSW) and a virtual machine (VM). The VM may be considered as a virtual host, and the VGW may be considered as virtual CPE. For the enterprise X, it may be considered that the enterprise X has an end-to-end connection from the host 21 to the VM.

The provider network 31 and the provider network transmit traffic between the campus network 20 and the VPC service for the enterprise X, and provide a corresponding service. From the perspective of the enterprise X, the devices in the provider network 31 and the provider network 32 may be virtualized into virtual routers. For example, the PE device 31', the PE device 32', the PE device 31, and the PE device 32 are virtualized into virtual routers rt1 to rt4. The provider network 31 and the provider network 32 may further include other individual and enterprise tenants in addition to the enterprise X. This is not limited in this embodiment of the present disclosure.

As shown in FIG. 7, the scenario may further include: a provider management device 31" in the provider network 31, a provider management device 32" in the provider network 32, and a cloud management device 40 in the cloud provider network 40. The provider management device 31" is configured to manage and control the devices in the provider network 31, and is further configured to provide a management interface to the enterprise X through a Web portal. Similarly, the provider management device 32" is configured to manage and control the devices in the provider network 32, and is further configured to provide a management interface to the enterprise X through the Web portal. The cloud management device 40 is configured to manage and control the devices (for example, the server 42) in the cloud provider network 40, and is further configured to provide a management interface to the enterprise X through the Web portal. The scenario may further include a service management device (or referred to as a service orchestrator) 20. In an aspect, the service management device 20 is configured to manage and control a physical device (for example, the host 21, the switch 22, or the CPE 23) of the service management device 20. In another aspect, the service management device 20 is configured to manage the virtual routers rt1 to rt4 through the management interface provided by the provider management device. In still another aspect, the service management device 20 is configured to manage the VM, the VSW, rt0, and the VGW through the management interface provided by the cloud management device 40.

In an example, that the indication information is carried in an IPv6 address is used as an example. The provider network 31 configures three IPv6 addresses for the enterprise X, and corresponding configuration information may be:

(tenant=enterprise X, IPv6 address=SID1, QoS requirement<transmission path=path with minimum overheads>)

(tenant=enterprise X, IPv6 address=SID2, QoS requirement<transmission path=path with minimum latency>)

(tenant=enterprise X, IPv6 address=SID3, QoS requirement<transmission path=path with an exclusive fiber wavelength or timeslot>)

Similarly, the provider network 32 configures three IPv6 addresses for the enterprise X, and corresponding configuration information may be:

(tenant=enterprise X, IPv6 address=SID4, QoS requirement<transmission path=path with minimum overheads>)

(tenant=enterprise X, IPv6 address=SID5, QoS requirement<transmission path=path with minimum latency>)

(tenant=enterprise X, IPv6 address=SID6, QoS requirement<transmission path=path with an exclusive fiber wavelength or timeslot>)

The configuration information may be statically configured on the provider management device 31" and the provider management device 32" or obtained from the PE device in the corresponding provider network. In this case, the service management device 20 may obtain the configuration information from the provider management device 31" and the provider management device 32" and send the configuration information to the host 21 and/or the CPE 23 in the campus network 10. Similarly, the service management device 20 may obtain the configuration information from the provider management device 31" and the provider management device 32", and send the configuration information to the VM and/or the VGW in the cloud provider network 40. Alternatively, the service management device 20 may obtain the configuration information from the provider management device 31" and the provider management device 32", and send the configuration information to the VM and/or the VGW through the cloud management device 40 in the cloud provider network 40.

For a specific service, the service management device 20 or the service management device 20 sends corresponding configuration information to the VM (or the VGW) through the cloud management device 40, to indicate the VM (or the VGW) to encapsulate an IPv6 address in the configuration information into a packet of the specific service. Alternatively, the cloud management device 40 may deliver all configuration information to the VM (or the VGW), and the VM (or the VGW) selects one of the QoS requirements according to an actual service requirement, and encapsulates a corresponding IPv6 address into a packet.

Similarly, the service management device 20 may deliver corresponding configuration information to the host 21 (or the CPE 23) for a specific service, and indicate the host 21 (or the CPE 23) to encapsulate an IPv6 address in the configuration information into a packet of the specific service. Alternatively, the service management device 20 may deliver all configuration information to the host 21 (or the CPE 23), and the host 21 (or the CPE 23) selects one of the QoS requirements according to an actual service requirement, and encapsulates a corresponding IPv6 address into a packet.

It can be learned that according to the method provided in this embodiment of the present disclosure, both an enterprise tenant and a cloud provider can autonomously select services of different service classes provided by the provider network, so that flexibility of providing a service by the provider network is improved.

It should be noted that, in this embodiment of the present disclosure, a granularity of selecting a QoS requirement is not limited. For example, different QoS requirements may be selected for different services, or different QoS requirements may be selected for different traffic.

It should be noted that, in this embodiment of the present disclosure, the PE device may be a network device such as a switch, a router, or a firewall. The CE device may be a device having a private network access function, for example, may be a device such as a switch, a router, an internet of things (IoT) terminal, or a host.

It should be noted that, in this embodiment of the present disclosure, in one case, the configuration information may be a correspondence between a plurality of pieces of information. For example, the configuration information on the PE device may be a correspondence between an identifier of a tenant, an interface, indication information, a QoS requirement, a path, and a topology identifier. In another case, the configuration information may alternatively include a correspondence between a plurality of groups of partial information. For example, the configuration information on the PE device includes a correspondence 1 between indication information and a QoS requirement, a correspondence 2 between indication information and a path, a correspondence 3 between an identifier of a tenant and an interface, a correspondence 4 between an identifier of a tenant and indication information, and a correspondence 4 among indication information, a QoS requirement, and a topology identifier. The identifier of the tenant is used for uniquely identifying the tenant, for example, may be a VPN identifier of the tenant or a VNI corresponding to the tenant. It should be noted that a specific representation form of the configuration information is not limited in this embodiment of the present disclosure, provided that it can be ensured that the provider network provides a required service to the tenant.

The foregoing uses the scenarios shown in FIG. 1 and FIG. 7 as examples to describe application of the technical solutions in embodiments of the present disclosure in different scenarios. The application scenarios are merely examples of several scenarios provided in embodiments of the present disclosure, and do not constitute a limitation on embodiments of the present disclosure.

With reference to the accompanying drawings, the following describes the packet processing method provided in embodiments of the present disclosure.

Figure 8:
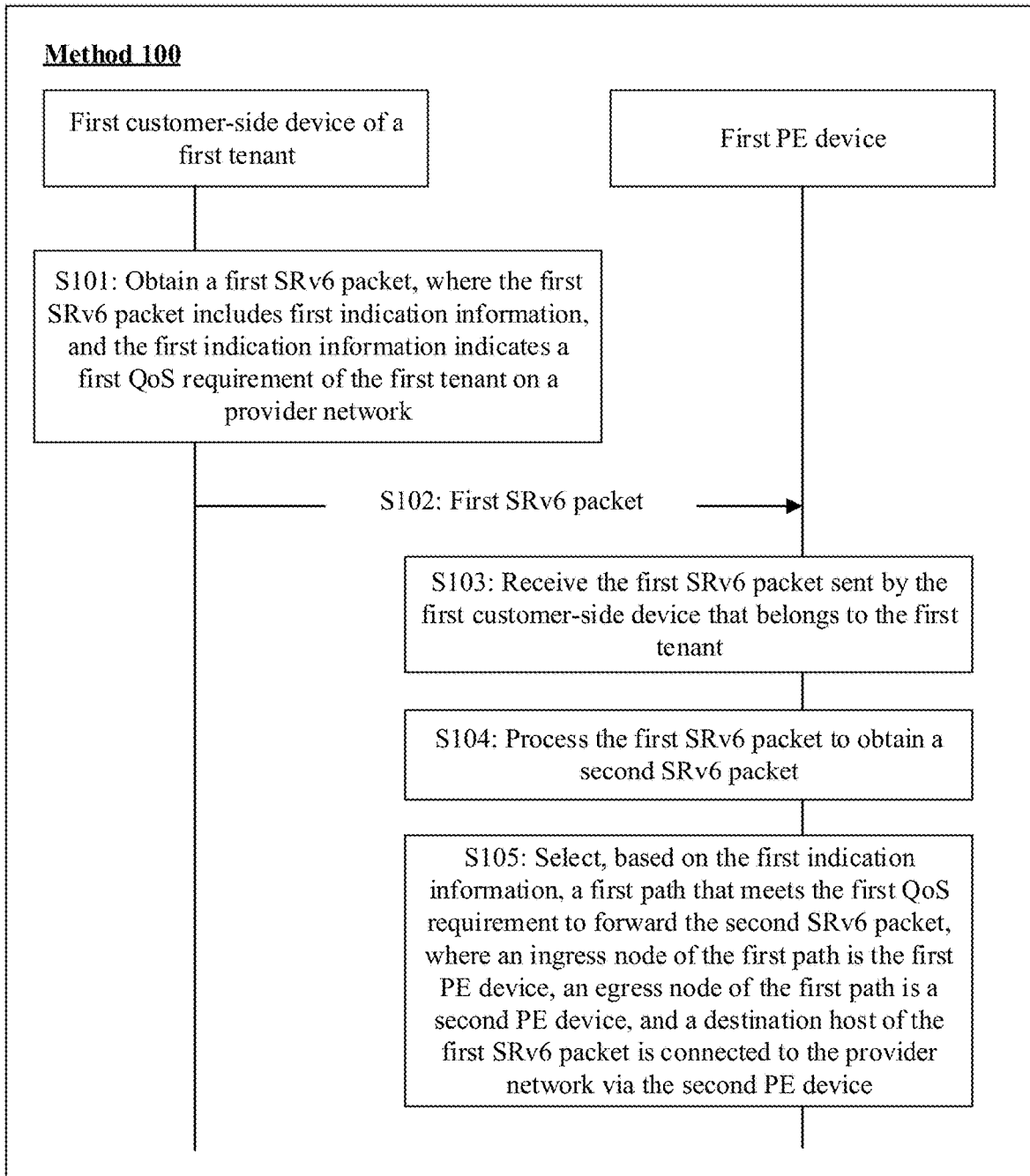
FIG. 8 is a schematic flowchart of a packet processing method 100 according to an embodiment of the present disclosure.

FIG. 8 is a schematic flowchart of a packet processing method 100 according to an embodiment of the present disclosure. The method 100 is described by using interaction between a first customer-side device of a first tenant and a first PE device. For example, the first customer-side device in the method 100 is the customer-side device 11 in FIG. 1, and the first PE device may be the PE device 1 in FIG. 1. In another example, the first customer-side device in the method 100 is the host 21 or the CPE 23 in FIG. 7, and the first PE device may be the PE device 31 or the PE device 32 in FIG. 7 (corresponding to rt3 or rt4 for the enterprise X). In another example, the first customer-side device in the method 100 is the VM or the VGW in FIG. 7, and the first PE device may be the PE device 31' or the PE device 32' in FIG. 7 (corresponding to rt1 or rt2 for the enterprise X). Referring to FIG. 8, the method 100 may include, for example, S101 to S104.

S101: The first customer-side device of the first tenant obtains a first SRv6 packet, where the first SRv6 packet includes first indication information, and the first indication information indicates a first QoS requirement of the first tenant on a provider network.

In an example, the first customer-side device may be a CE device of the first tenant. In one case, the first customer-side device may be a network device such as a switch or a router. In this case, a host of the first tenant is connected to the provider network by the first customer-side device, and the first customer-side device is directly connected to the first PE device. In another case, the first customer-side device may be a host of the first tenant. In this case, the first customer-side device may be directly connected to the first PE device in the provider network, or the first customer-side device may be indirectly connected to the first PE device by a network device such as a switch or a router. For example, in the scenario shown in FIG. 1, if the first tenant is the tenant 1, the first customer-side device may be the customer-side device 11, and the first PE device corresponds to the PE device 1. Alternatively, the first customer-side device may be the customer-side device 12, and the first PE device corresponds to the PE device 4. If the first tenant is the tenant 2, the first customer-side device may be the customer-side device 21, and the first PE device corresponds to the PE device 1. Alternatively, the first customer-side device may be the customer-side device 22, and the first PE device corresponds to the PE device 4. Alternatively, the first customer-side device may be the customer-side device 23, and the first PE device corresponds to the PE device 5. In another example, in the scenario shown in FIG. 7, if the first tenant is the enterprise X, the first customer-side device may be the host 21, and the first PE device corresponds to the PE device 31 or the PE device 32. Alternatively, the first customer-side device may be a VM, and the first PE device corresponds to the PE device 31' or the PE device 32', and the VM may be considered as a virtual host on the side of the cloud provider network 40.

In another example, the first customer-side device may be CPE of the first tenant. A host of the first tenant is connected to the provider network by the first customer-side device, and the first customer-side device is directly connected to the first PE device. For example, in the scenario shown in FIG. 7, if the first tenant is the enterprise X, the first customer-side device may be the CPE 23, and the first PE device corresponds to the PE device 31 or the PE device 32. Alternatively, the first customer-side device may be a VGW, and the first PE device corresponds to the PE device 31' or the PE device 32', and the VGW may be considered as virtual CPE on the side of the cloud provider network 40.

The first SRv6 packet may be a packet that is obtained by the first customer-side device and that is obtained after SRv6 encapsulation is performed on a service packet of the first tenant. A device that performs SRv6 encapsulation on the service packet of the first tenant may be a host of the first tenant, or may be a network device such as a switch or a router connected to the host of the first tenant. The first indication information in the first SRv6 packet is indication information that is determined by the first tenant according to the first QoS requirement of the service packet and that indicates the first QoS requirement on the provider network. The first indication information is carried in the first SRv6 packet, so that the first PE device receiving the first SRv6 packet can sense the first QoS requirement, to allow the tenant to autonomously select a service class.

A destination host of the first tenant or a CE device or CPE connected to the destination host that the first SRv6 packet needs to reach may be denoted as a second customer-side device. The second customer-side device is connected to the provider network via a second PE device. The second PE device is an egress node of the first SRv6 packet in the provider network. The first PE device and the second PE device belong to the provider network. The first SRv6 packet may include an address of the second customer-side device, to indicate the first SRv6 packet to pass through or reach the second customer-side device.

The first SRv6 packet includes an SRH. If the second PE device is not specified in the first SRv6, the SID list of the SRH may include the SID of the first PE device and the SID of the second customer-side device. In one case, if the first customer-side device is a host of the first tenant, the SID of the second customer-side device in the SID list of the SRH may be the SID of the destination host. For example, for the first SRv6 packet, refer to the SRv6 packet 1 shown in FIG. 4A. In another case, if the first customer-side device is a network device (referred to as a CE device or CPE in the following) such as a switch or a router connected to the host of the first tenant, the SID of the second customer-side device in the SID list of the SRH may be a SID of a CE device or CPE connected to the destination host. For example, for the first SRv6 packet, refer to the SRv6 packet 1 shown in FIG. 5A. If the second PE device is specified in the first SRv6, the SID list of the SRH may further include the SID of the second PE device. For example, for the first SRv6 packet, refer to the SRv6 packet 1 shown in FIG. 6A.

The first QoS requirement indicates a service that needs to be provided by the first tenant for processing the first SRv6 packet by the provider network. In the provider network, paths of different path types are set between PE devices to meet different QoS requirements of tenants. When the first PE device forwards an SRv6 packet of each tenant, a path type and a specific path that are used affect a service provided by the provider network for the SRv6 packet of the tenant. The path between the PE devices in the provider network may include, but is not limited to: an LSP that performs MPLS-based forwarding, an IPv6 tunnel, an SRv6 tunnel, or a physical link. A bearer technology for a physical link may include: link layer-based encapsulation corresponding to a single physical link, or link layer-based encapsulation corresponding to a first wavelength or timeslot of a single physical fiber link. The QoS requirement includes, but not limited to, at least one of the following: a path overhead requirement, a latency requirement, a bandwidth requirement, a link jitter requirement, a bit error requirement, and a to-be-allocated fiber wavelength or timeslot requirement. In this case, for example, the first QoS requirement may correspond to a requirement of minimum path overheads, or may correspond to a requirement of latency being less than preset latency. The first path that meets the first QoS may be, for example, an LSP 1 that performs MPLS-based forwarding. Corresponding to the scenario shown in FIG. 1, the LSP 1 may be a direct path from the PE device 1 to the PE device 4 through the PE device 2.

The first indication information may be any information that can be carried in the first SRv6 packet and that is sensed and identified by the first PE device.

In an example, the first indication information may be a first IPv6 address in a dedicated IPv6 address set allocated by the first PE device to the first tenant. The first IPv6 address is used for carrying the first indication information. The IPv6 address set may be an IPv6 network segment, for example, 2001:db8:A1::/48, allocated by the first PE device to the first tenant. The IPv6 address set may include a plurality of IPv6 addresses, and each IPv6 address in the plurality of IPv6 addresses may correspond to one QoS requirement of the first tenant. For example, a QoS requirement corresponding to 2001:db8:A1::1 is a path with minimum overheads, and a QoS requirement corresponding to 2001:db8:A1::2 is a path with minimum latency. In one case, the first IPv6 address may be used as a whole to carry the first indication information. For example, 2001:db8:A1::1 is the first indication information. In another case, some fields (for example, a Function field or an Argument field) in the first IPv6 address are used for carrying the first indication information. For example, in 2001:db8:A1::1, a value "1" of the Function field is the first indication information. In the example, a value of an outer destination IP address field in the first SRv6 packet is the first IPv6 address. After receiving the first SRv6 packet, the first PE device obtains the first IPv6 address from the outer destination IP address field of the first SRv6 packet by parsing the first SRv6 packet, to determine the first QoS requirement based on the first IPv6 address or the value of the field that is in the first IPv6 address and that is used for carrying the first indication information.

In another example, the first indication information may be a service code corresponding to the first QoS requirement, and the service code may be a standard code determined through negotiation between a provider network and a tenant. For example, a service code 1 indicates that a QoS requirement is a path with minimum latency, a service code 2 indicates that a QoS requirement is a path with minimum overheads, and a service code 3 indicates that a QoS requirement is a path with minimum link jitter. In one case, the service code may be carried in some fields in the dedicated IPv6 address set allocated by the first PE device to the first tenant. For example, the service code is carried in a Function field or an Argument field of the dedicated IPv6 address set allocated by the first PE device to the first tenant. In another case, the service code may be carried through information other than the IPv6 address. For example, the service code is carried in any IPv6 extension header of the first SRv6 packet. In the example, for example, the first SRv6 packet includes an IPv6 extension header carrying a service code. After receiving the first SRv6 packet, the first PE device obtains the IPv6 extension header by parsing the first SRv6 packet, to determine the first QoS requirement based on the first IPv6 extension header. The first IPv6 extension header may be, for example, an SRH in the first SRv6 packet. In another example, a Traffic Class field in an IPv6 header of the first SRv6 packet may be used for carrying a service code. After receiving the first SRv6 packet, the first PE device obtains the Traffic Class field in the IPv6 header by parsing the first SRv6 packet, to determine the first QoS requirement based on the Traffic Class field.

During specific implementation, in S101, that the first customer-side device obtains the first SRv6 packet may be, for example, that the first customer-side device performs SRv6 encapsulation on the obtained service packet of the first tenant to obtain the first SRv6 packet, or may be that the first customer-side device receives the first SRv6 packet. When the first customer-side device is a CE device or CPE, S101 may include: A host connected to the first customer-side device performs SRv6 encapsulation on a service packet to obtain a first SRv6 packet. The host sends the first SRv6 packet to the first customer-side device. Alternatively, S101 may include: A host connected to the first customer-side device sends a service packet to the first customer-side device. The first customer-side device performs SRv6 encapsulation on the service packet to obtain the first SRv6 packet. When the first customer-side device is a host of the first tenant, regardless of whether the first customer-side device is directly connected to the first PE device or is connected to the first PE device by a CE device or CPE, S101 may include: The first customer-side device performs SRv6 encapsulation on the service packet of the first tenant to obtain the first SRv6 packet. In a scenario in which the first customer-side device is connected to the first PE device by a CE device or CPE, the CE device or the CPE between the first customer-side device and the first PE device performs only IPv6 forwarding on the first SRv6 packet, and does not change a destination address and an SRH of the first SRv6 packet.

It should be noted that before S101, both the first PE device and the first customer-side device need to obtain configuration information. The configuration information includes a correspondence between indication information and a QoS requirement, so that the method 100 can be accurately implemented. The correspondence between indication information and a QoS requirement may include, but is not limited to, a correspondence between the first indication information and the first QoS requirement. The correspondence between the first indication information and the first QoS requirement is used as an example. In an example, the correspondence between the first indication information and the first QoS requirement may be configured on the first PE device. The first PE device locally stores the correspondence between the first indication information and the first QoS requirement, and may also directly or indirectly send the correspondence between the first indication information and the first QoS requirement to the first customer-side device in an offline or protocol packet form. That the first PE device indirectly sends the correspondence between the first indication information and the first QoS requirement to the first customer-side device may be that the first PE device sends the correspondence between the first indication information and the first QoS requirement to the first customer-side device sequentially through the provider management device and the service management device. In another example, the correspondence between the first indication information and the first QoS requirement may be configured on the provider management device. In this case, the provider management device may send the correspondence between the first indication information and the first QoS requirement to the first PE device, or may send the correspondence between the first indication information and the first QoS requirement to the first customer-side device through the service management device.

In this embodiment of the present disclosure, a specific form of the configuration information locally stored by the first PE device is not limited, provided that the first PE device can determine, based on the locally stored configuration information and the first indication information in the first SRv6 packet, the first path that meets the first QoS requirement corresponding to the first indication information, to provide a service to the first tenant based on the first path. In an example, the configuration information locally stored in the first PE device includes the first configuration information indicating the correspondence between the first indication information and the first QoS requirement. The provider network determines, according to the first QoS requirement in the first configuration information, to provide a service that can meet the first QoS requirement the first tenant. In one case, if the first tenant accesses the provider network through only two PE devices (that is, the first PE device and the second PE device), the first QoS requirement of the first tenant corresponds to the first path in the provider network. In another case, if the first tenant accesses the provider network through more than two PE devices, a topology identifier may be further configured. The topology identifier identifies a network topology of the provider network. The network topology indicates a plurality of PE devices through which the first tenant accesses the provider network. In this case, the first QoS requirement of the first tenant corresponds to the first path in the network topology of the provider network. In this case, the configuration information stored in the first PE device may include a correspondence between the first indication information and the topology identifier, and the correspondence may be denoted as third configuration information. In another example, the configuration information locally stored in the first PE device includes second configuration information indicating a correspondence between the first indication information and the first path, and the provider network provides, to the first tenant based on the first path, a service that can meet the first QoS requirement of the first tenant.

It can be learned that, when having different QoS requirements for different traffic, for different traffic, a side of a tenant may autonomously select indication information that meets a QoS requirement for the traffic, and obtain an SRv6 packet including the indication information, so that a PE device in a provider network can subsequently sense a QoS requirement of the tenant for the traffic, to prepare for providing a service that meets the QoS requirement for the traffic.

S102: The first customer-side device sends the first SRv6 packet to a first PE device.

S103: The first PE device receives the first SRv6 packet sent by the first customer-side device that belongs to the first tenant.

During specific implementation, the first PE device may further locally store a matching relationship between each interface and the indication information. After receiving the SRv6 packet, the first PE device may determine an interface that receives the SRv6 packet, to determine whether the interface and the indication information in the SRv6 packet meet the matching relationship. If the interface and the indication information meet the matching relationship, it is considered that the SRv6 packet needs to be processed, and the following S104 is performed on the SRv6 packet. If the interface and the indication information do not meet the matching relationship, it is considered that the SRv6 packet does not meet a condition for subsequent processing, so that the SRv6 packet is discarded, and the following S104 is not skipped.

In an example, the first PE device stores sixth configuration information that indicates the first interface of the first PE device and the first indication information, and S103 is that the first PE device receives the first SRv6 packet from the first interface. In this case, the first PE device determines, based on the sixth configuration information, that the first indication information in the first SRv6 packet matches the locally stored first indication information corresponding to the first tenant. Therefore, the following S104 may be performed.

In another example, the first PE device stores fifth configuration information that indicates the first interface of the first PE device and an identifier of the first tenant and fourth configuration information that indicates the identifier of the first tenant and the first indication information. In this case, S103 may include: After receiving the first SRv6 packet from the first interface, the first PE device determines, based on the fifth configuration information, that the first SRv6 packet is from the first tenant. Therefore, before the following S104 is performed, the first PE device determines, based on the fourth configuration information, that the first indication information in the first SRv6 packet matches the locally stored first indication information corresponding to the first tenant, to trigger execution of the following S104.

For example, in the scenario shown in FIG. 1, if the PE device 1 stores a matching relationship 1 between the interface 1 and 2001:db8:A1::1, a matching relationship 2 between the interface 1 and 2001:db8:A1::2, and a matching relationship 3 between the interface 1 and 2001:db8:A1::3. When the PE device 1 receives an SRv6 packet a from the interface 1 of the customer-side device 11, if the indication information of the SRv6 packet a is the outer destination IP address 2001:db8:A1::2, it is considered that the interface 1 and the indication information in the SRv6 packet a meet the matching relationship 2, and the following S104 may be performed on the SRv6 packet a. When the PE device 1 receives an SRv6 packet b from the interface 1 of the customer-side device 11, if the indication information of the SRv6 packet b is the outer destination IP address 2001:db8:A1::7, it is considered that the interface 1 and the indication information in the SRv6 packet b meets none of the foregoing three matching relationships, so that the SRv6 packet b is discarded, and the following S104 is skipped.

S104: The first PE device processes the first SRv6 packet to obtain a second SRv6 packet.

S105: The first PE device selects, based on the first indication information, a first path that meets the first QoS requirement to forward the second SRv6 packet, where an ingress node of the first path is the first PE device, an egress node of the first path is a second PE device, and a destination host of the first SRv6 packet is connected to the provider network by the second PE device.

For S104, in one aspect, the first PE device may subtract 1 from a value of an SL field in the SRH of the first SRv6 packet, so that a SID of a next hop of the first PE device in the SID list indicated by the SL field is obtained. In addition, the first PE device updates a value of the outer destination IP address field in the IPv6 header in the first SRv6 packet. Specifically, the value of the outer destination IP address field in the IPv6 header may be updated based on the SID in the SID list indicated by the SL in the SRH. In another aspect, the first PE device may select, based on the first indication information, a first path that meets the first QoS requirement, to correspondingly encapsulate the first SRv6 packet based on the first path. For example, if the first path is an LSP that performs MPLS-based forwarding, the encapsulating the first SRv6 packet based on the first path may be encapsulating, on the basis of the first SRv6 packet, an MPLS label stack corresponding to the first path. In another example, if the first path is an SRv6 tunnel, the encapsulating the first SRv6 packet based on the first path may be performing SRv6 encapsulation on the basis of the first SRv6 packet. In another example, if the first path is an IPv6 tunnel, the encapsulating the first SRv6 packet based on the first path may be encapsulating, on the basis of the first SRv6 packet, an IPv6 header corresponding to the first path.

It should be noted that, if the value of the SL field in the SRH of the packet is equal to 0 after being subtracted by 1, the first PE device may also delete the SRH, and update a field that is in the IPv6 header of the packet and that indicates a packet length.

For example, if the first SRv6 packet is an SRv6 packet 1 shown in FIG. 4A, for the second SRv6 packet, refer to the packet 2 shown in FIG. 4B. In another example, if the first SRv6 packet is the SRv6 packet 1 shown in FIG. 5A, for the second SRv6 packet, refer to the packet 2 shown in FIG. 5B. In still another example, if the first SRv6 packet is the SRv6 packet 1 shown in FIG. 6A, for the second SRv6 packet, refer to the packet 2 shown in FIG. 6B.

In an example, if the first PE device stores the correspondence between the first indication information and the first path, S105 may include: The first PE device obtains the first indication information from the first SRv6 packet, and searches the locally stored correspondence for the first path corresponding to the first indication information in the first SRv6 packet. Next, the first PE device forwards the first SRv6 packet to the second PE device based on the first path.

In another example, if the first PE device stores the correspondence between the first indication information and the first QoS requirement, S105 may include: The first PE device obtains the first indication information from the first SRv6 packet, searches the locally stored correspondence for the first QoS requirement corresponding to the first indication information in the first SRv6 packet, and determines, in the provider network, a first path that starts from the first PE device and that meets the first QoS requirement. Next, the first PE device forwards the first SRv6 packet to the second PE device based on the first path.

In still another example, if the first PE device stores the correspondence between the first indication information and the topology identifier, and the first PE device further specifies different network topologies, S105 may include: The first PE device obtains the first indication information from the first SRv6 packet, searches, in one aspect, the locally stored correspondence for the topology identifier corresponding to the first indication information in the first SRv6 packet, and determines, in another aspect, in a network topology indicated by the topology identifier of the provider network, a first path that starts from the first PE device and that meets the first QoS requirement. Next, the first PE device forwards the first SRv6 packet to the second PE device based on the first path.

It should be noted that, in a process in which the first PE device sends the second SRv6 packet to the second PE device through the first path, each intermediate device forwards the second SRv6 packet based on an outer header corresponding to the first path in the second SRv6 packet, and content in an inner IPv6 header and the SRH remains unchanged. For example, in the scenario shown in FIG. 1, if the second SRv6 packet sent by the first PE device corresponds to the packet 2 shown in FIG. 4B, for a packet received by the second PE device, refer to the packet 3 shown in FIG. 4C, and for a packet sent by the second PE device to the destination host, refer to the SRv6 packet 4 shown in FIG. 4D. Alternatively, if the second SRv6 packet sent by the first PE device corresponds to the packet 2 shown in FIG. 5B, for a packet received by the second PE device, refer to the packet 3 shown in FIG. 5C, and for a packet sent by the second PE device to the destination host, refer to the SRv6 packet 4 shown in FIG. 5D.

In some implementations, for a tenant, configuration information stored in the PE device and the customer-side device includes indication information indicating a plurality of QoS requirements. For example, the first customer-side device and the first PE device further include second indication information indicating a second QoS requirement, and the second QoS requirement corresponds to a second path in the provider network. In this case, the method 100 may further include: The first customer-side device of the first tenant obtains a third SRv6 packet, where the third SRv6 packet includes second indication information, and the second indication information indicates the second QoS requirement of the first tenant on the provider network for processing the third SRv6 packet. The first customer-side device sends the third SRv6 packet to the first PE device. The first PE device receives the third SRv6 packet sent by the first customer-side device. The first PE device processes the third SRv6 packet to obtain a fourth SRv6 packet. The first PE device selects, based on the second indication information, the second path that meets the second QoS requirement to forward the fourth SRv6 packet.

In other implementations, for a plurality of different tenants, configuration information stored in the PE device includes indication information indicating different QoS requirements of different tenants. For example, the first PE device further includes third indication information indicating a third QoS requirement of a second tenant, and the third QoS requirement corresponds to a third path in the provider network. In this case, the method 100 may further include: A third customer-side device of the second tenant obtains a fifth SRv6 packet, where the fifth SRv6 packet includes third indication information, and the third indication information indicates the third QoS requirement of the second tenant on the provider network for processing the fifth SRv6 packet. The third customer-side device sends the fifth SRv6 packet to the first PE device. The first PE device receives the fifth SRv6 packet sent by the third customer-side device. The first PE device processes the fifth SRv6 packet to obtain a sixth SRv6 packet. The first PE device selects, based on the third indication information, the third path that meets the third QoS requirement to forward the sixth SRv6 packet. The second tenant may correspond to the tenant 2 in the scenario shown in FIG. 1, and the third customer-side device may be the customer-side device 21. In the scenario shown in FIG. 7, the second tenant may be an enterprise Y (not shown in FIG. 7) connected to the provider network 31 and/or the provider network 32, and the third customer-side device may be a host or CPE in a campus network of the enterprise Y.

It can be learned that according to the method 100 provided in this embodiment of the present disclosure, a customer-side device of a tenant can obtain SRv6 packets including different indication information. The different indication information indicates different QoS requirements of the tenant on a provider network, and the different QoS requirements correspond to different service classes. In addition, the customer-side device sends the SRv6 packet to a PE device in the provider network, so that the PE device can be aware of the QoS requirement of the tenant for the traffic, to provide, for the traffic, a service that meets the QoS requirement. In this way, when a tenant has different QoS requirements for different traffic, for different traffic, indication information that meets a QoS requirement for the traffic can be autonomously selected. Therefore, a tenant and a provider do not need to reach an agreement repeatedly for different traffic, and a provider network also does not need to establish a new SRv6 tunnel according to a newly added agreement, so that the provider network provides a flexible and friendly bearer service to the tenant, to improve use experience of the tenant regarding the bearer service of the provider network.

Figure 9:
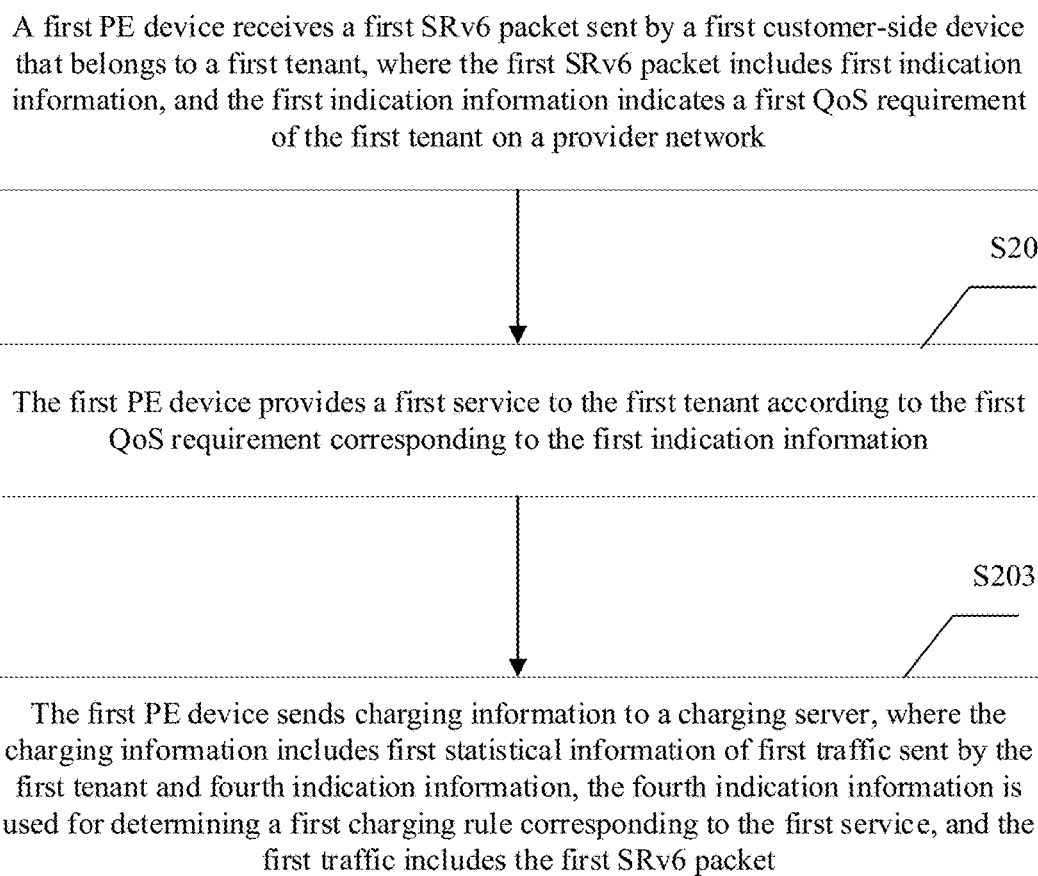
FIG. 9 is a schematic flowchart of another packet processing method 200 according to an embodiment of the present disclosure.

An embodiment of the present disclosure further provides a packet processing method 200, as shown in FIG. 9. In the method 200, a tenant may select a bearer service with reference to charging rules corresponding to various optional bearer services provided by a provider network, and the provider network may complete charging of corresponding traffic based on autonomous selection of the tenant.

Referring to FIG. 9, the method 200 may include the following steps.

S201: A first PE device receives a first SRv6 packet sent by a first customer-side device that belongs to a first tenant, where the first SRv6 packet includes first indication information, and the first indication information indicates a first QoS requirement of the first tenant on a provider network.

S202: The first PE device provides a first service to the first tenant according to the first QoS requirement corresponding to the first indication information.

The first service is a service that meets the first QoS requirement. For example, the first PE device in the provider network may forward, through a first path, a second SRv6 packet obtained by processing the first SRv6 packet. It is considered that the first service is provided to the first tenant.

It should be noted that, for related descriptions and achieved effects of S201 and S202, refer to related descriptions in the method 100.

S203: The first PE device sends charging information to a charging server, where the charging information includes first statistical information of first traffic sent by the first tenant and fourth indication information, the fourth indication information is used for determining a first charging rule corresponding to the first service, and the first traffic includes the first SRv6 packet.

During specific implementation, the first PE device may separately collect statistics on traffic based on indication information that is carried in traffic received from a customer-side device and that indicates a QoS requirement, to obtain corresponding statistical information. The collecting statistics on traffic by the first PE device may include counting a quantity of packets and/or a quantity of bytes in the traffic.

A provider can specify different charging rules for different services. The charging rules can be configured on a PE device in the provider network or on the charging server. For a same service, different tenants may have the same charging rule or different charging rules.

In an example, the fourth indication information in S203 may be the first charging rule. In one case, if the provider configures the first charging rule on the first PE, the charging information sent by the first PE device to the charging server in S203 needs to include the fourth indication information. In this way, the charging server may calculate, based on the fourth indication information and the first statistical information, a fee generated when the first tenant transmits the first traffic in the provider network. In another case, if the provider configures a correspondence between the first charging rule and the first indication information on the charging server, the charging information sent by the first PE device to the charging server in S203 may not carry the fourth indication information, but needs to carry the first indication information. In this way, the charging server may determine, based on the first indication information in the received charging information, the first charging rule that matches the first indication information, and then calculates, based on the first charging rule and the first statistical information, a fee generated when the first tenant transmits the first traffic in the provider network. It should be noted that, when the fourth indication information is the first charging rule, the first PE device may directly calculate, according to the first charging rule and the first statistical information, a fee generated when the first tenant transmits the first traffic in the provider network, and send the fee to the charging server.

In another example, the fourth indication information in S203 may be information indicating the first service. For example, the fourth indication information may be the first indication information or the first QoS requirement. In this case, a correspondence between the first charging rule and the fourth indication information needs to be configured on the charging server. In S203, the charging information sent by the first PE device to the charging server carries the fourth indication information. In this way, the charging server may determine, based on the fourth indication information in the received charging information, the first charging rule that matches the fourth indication information, and then calculate, according to the first charging rule and the first statistical information, a fee generated when the first tenant transmits the first traffic in the provider network.

For example, the first PE device collects statistics on the first traffic that is from the first tenant and that carries the first indication information, and the obtained first statistical information may include: the first indication information, a quantity of packets=1000, and a quantity of bytes=1456000 bytes, where the first traffic includes the first SRv6 packet. In another example, the first PE device collects statistics on second traffic that is from the first tenant and that carries the second indication information, and obtained second statistical information may include: the second indication information, a quantity of packets=2000, and a quantity of bytes=2866000 bytes, where the second traffic includes a third SRv6 packet. In still another example, the first PE device collects statistics on third traffic that is from the second tenant and that carries the third indication information, and obtained third statistical information may include: the third indication information, a quantity of packets=3000, and a quantity of bytes=4567000 bytes, where the third traffic includes a fifth SRv6 packet. The first charging rule that is set by the provider network for the first service corresponding to the first indication information of the first tenant is 0.1 yuan per megabyte, a second charging rule that is set for a second service corresponding to the second indication information of the first tenant is 0.2 yuan per megabyte, and a third charging rule that is set for a third service corresponding to the third indication information of the second tenant is 0.5 yuan per megabyte. In this case, that the charging information sent by the first PE device to the charging server includes a charging rule is used as an example, and the charging information sent by the first PE device to the charging server may include:

Charging information 1: (first indication information, a quantity of packets=1000, a quantity of bytes=1456000 bytes, and 0.1 yuan per megabyte)

Charging information 2: (second indication information, a quantity of packets=2000, a quantity of bytes=2866000 bytes, and 0.2 yuan per megabyte)

Charging information 3: (third indication information, a quantity of packets=3000, a quantity of bytes=4567000 bytes, and 0.5 yuan per megabyte)

In this case, the charging server may calculate, based on the charging information 1, that a fee generated when the first tenant transmits the first traffic in the provider network is (1456000 bytes/1000000)*0.1 yuan/megabytes≈0.14 yuan. The charging server may calculate, based on the charging information 2, that a fee generated when the first tenant transmits the second traffic in the provider network is (2866000 bytes/1000000)*0.2 yuan/megabytes≈0.57 yuan. The charging server may calculate, based on the charging information 3, that a fee generated when the second tenant transmits the third traffic in the provider network is: (4567000 bytes/1000000)*0.5 yuan/MB≈2.23 yuan.

It should be noted that the method 200 shown in FIG. 9 may be used with reference to the method 100. That is, a tenant adds indication information corresponding to different QoS requirements to an SRv6 packet, so that it can be ensured that a provider network provides a service that meets a requirement of the tenant, and different charging can be implemented based on different provided services, so that a bearer service provided by the provider network is more flexible and friendly. Alternatively, the method 200 shown in FIG. 9 may be used independently of the method 100. To be specific, a tenant selects different indication information according to different charging rules, to ensure that a provider network performs charging based on autonomous selection of the tenant, so that use experience of the tenant in using a bearer service of the provider network is improved.

It can be learned that, through the method 200, a PE device in a provider network can collect statistics on different traffic, and set different charging rules for the different traffic, so that a charging server of the provider network can accurately calculate, based on statistical information and a charging rule of traffic, a fee generated by the traffic in the provider network, a tenant autonomously selects a charging rule from a plurality of charging rules provided by the provider network, and the provider network completes charging according to the selected charging rule when the tenant enjoys a service corresponding to the selected charging rule in the provider network. This improves use experience of a tenant in using a bearer service of the provider network.

Figure 10:
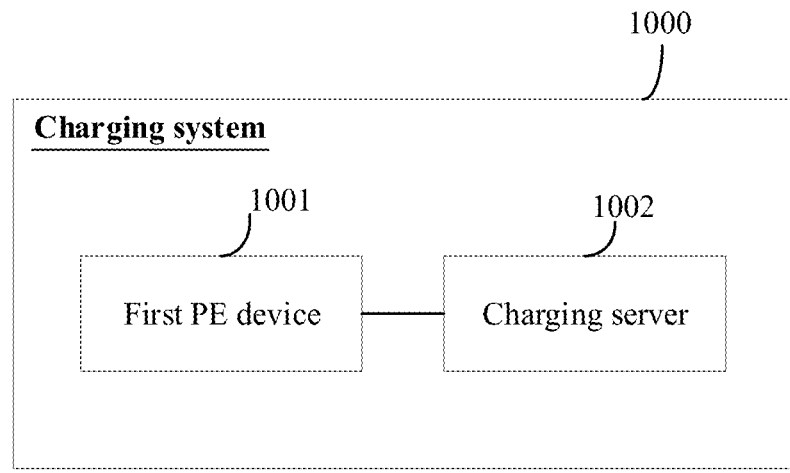
FIG. 10 is a schematic diagram of a structure of a charging system 1000 according to an embodiment of the present disclosure.

Correspondingly, an embodiment of the present disclosure provides a charging system 1000, as shown in FIG. 10. The charging system may include a first PE device 1001 and a charging server 1002.

The first PE device 1001 is configured to send charging information to the charging server 1002, where the charging information includes first statistical information of first traffic sent by a first tenant and fourth indication information, the fourth indication information is used for determining a first charging rule corresponding to a first service, and the first traffic includes a first SRv6 packet.

The charging server 1002 is configured to determine, based on the charging information, a fee generated when the first tenant transmits the first traffic in a provider network.

It should be noted that, for related descriptions and achieved effects of the charging system 1000, refer to related descriptions in the method 200 shown in FIG. 9.

Figure 11:
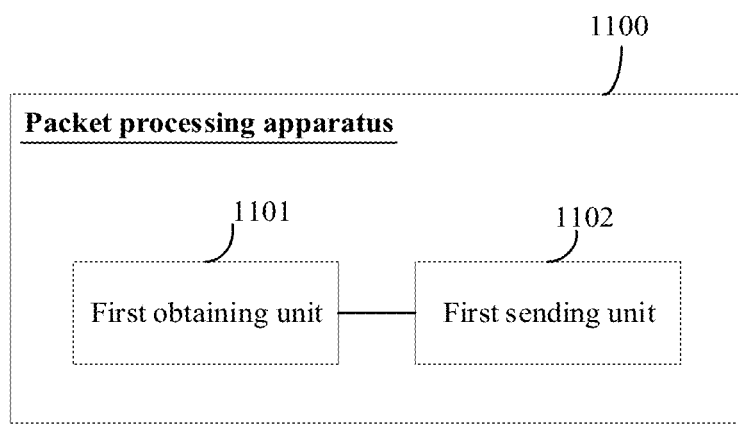
FIG. 11 is a schematic diagram of a structure of a packet processing apparatus 1100 according to an embodiment of the present disclosure.

In addition, an embodiment of the present disclosure further provides a packet processing apparatus 1100, as shown in FIG. 11. FIG. 11 is a schematic diagram of a structure of the packet processing apparatus 1100 according to an embodiment of the present disclosure. The packet processing apparatus 1100 is applied to a first customer-side device that belongs to a first tenant. The apparatus 1100 may include a first obtaining unit 1101 and a first sending unit 1102. The apparatus 1100 may be configured to perform the method 100 or the method 200 in the foregoing embodiments.

The first obtaining unit 1101 is configured to obtain a first segment routing over internet protocol version 6 SRv6 packet, where the first SRv6 packet includes first indication information, and the first indication information indicates a first quality of service QoS requirement of the first tenant on a provider network.

The first sending unit 1102 is configured to send the first SRv6 packet to a first provider edge PE device.

For a specific implementation of performing an operation by the first obtaining unit 1101 and achieved effects, refer to related descriptions of S101 in the method 100. For a specific implementation of performing an operation by the first sending unit 1102 and achieved effects refer to related descriptions of S102 in the method 100.

In an implementation, the apparatus 1100 may further include a second obtaining unit and a second sending unit. The second obtaining unit is configured to obtain a second SRv6 packet, where the second SRv6 packet includes second indication information, and the second indication information indicates a second QoS requirement of the first tenant on the provider network. The second sending unit is configured to send the second SRv6 packet to the first PE device.

In an implementation, the apparatus 1100 may further include a third obtaining unit. The third obtaining unit is configured to: before the first SRv6 packet is obtained, obtain a correspondence between the first indication information and the first QoS requirement.

In an example, the third obtaining unit is specifically configured to receive configuration information sent by the first PE device, where the configuration information indicates the correspondence between the first indication information and the first QoS requirement.

In another example, the third obtaining unit is specifically configured to receive configuration information sent by a service management device, where the configuration information indicates the correspondence between the first indication information and the first QoS requirement.

In an implementation, a segment identifier list SID list in a segment routing header SRH in the first SRv6 packet includes a SID of the first PE device and a SID of a second customer-side device, the second customer-side device belongs to the first tenant, the second customer-side device is connected to the provider network via a second PE device, the second PE device is a remote PE device in the first SRv6 packet in the provider network, and the second customer-side device may be a destination host of the first tenant that the first SRv6 packet needs to reach, or may be a CE device or CPE connected to a destination host. In an example, the SID list may further include a SID of the second PE device.

In another implementation, the SID list of the SRH may not include the SID of the first PE device, and an address of the first PE device is carried in a destination IP address field in the IPv6 header. In this way, a quantity of SIDs included in the SID list of the SRH can be reduced, and space occupied by the first SRv6 packet is effectively reduced.

Figure 12:
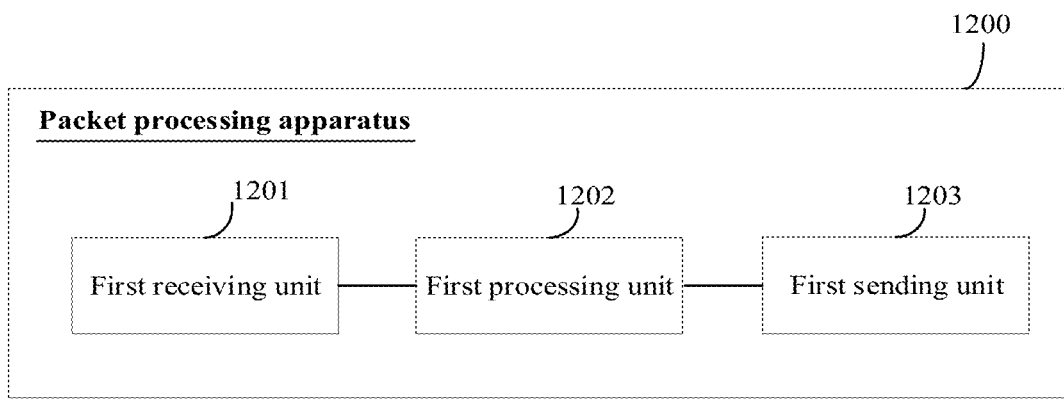
FIG. 12 is a schematic diagram of a structure of a packet processing apparatus 1200 according to an embodiment of the present disclosure.

In addition, an embodiment of the present disclosure further provides a packet processing apparatus 1200, as shown in FIG. 12. FIG. 12 is a schematic diagram of a structure of the packet processing apparatus 1200 according to an embodiment of the present disclosure. The packet processing apparatus 1200 is applied to a first PE device. The apparatus 1200 may include a first receiving unit 1201, a first processing unit 1202, and a first sending unit 1203. The apparatus 1200 may be configured to perform the method 100 or the method 200 in the foregoing embodiments.

The first receiving unit 1201 is configured to receive a first segment routing over internet protocol version 6 SRv6 packet sent by a first customer-side device that belongs to a first tenant, where the first SRv6 packet includes first indication information, and the first indication information indicates a first quality of service QoS requirement of the first tenant on a provider network.

The first processing unit 1202 is configured to process the first SRv6 packet to obtain a second SRv6 packet.

The first sending unit 1203 is configured to select, based on the first indication information, a first path that meets the first QoS requirement to forward the second SRv6 packet, where an ingress node of the first path is the first PE device, an egress node of the first path is a second PE device, and a destination host of the first SRv6 packet is connected to the provider network by the second PE device.

For a specific implementation of performing an operation by the first receiving unit 1201 and achieved effects, refer to related descriptions of S103 in the method 100. For a specific implementation of performing an operation by the first processing unit 1202 and achieved effects refer to related descriptions of S104 in the method 100. For a specific implementation of performing an operation by the first sending unit 1203 and achieved effects refer to related descriptions of S105 in the method 100.

In an implementation, a segment identifier list SID list in a segment routing header SRH in the first SRv6 packet includes a SID of the first PE device and a SID of a second customer-side device, the second customer-side device belongs to the first tenant, the second customer-side device is connected to the provider network via a second PE device, and the second customer-side device may be a destination host of the first tenant that the first SRv6 packet needs to reach, or may be a CE device or CPE connected to a destination host. In an example, the SID list may further include a SID of the second PE device.

In another implementation, the SID list of the SRH may not include the SID of the first PE device, and an address of the first PE device is carried in a destination IP address field in the IPv6 header. In this way, a quantity of SIDs included in the SID list of the SRH can be reduced, and space occupied by the first SRv6 packet is effectively reduced.

The first path is an LSP that performs MPLS-based forwarding, an SRv6 tunnel, or a physical fiber link.

In an implementation, the apparatus 1200 may further include a second receiving unit, a second processing unit, and a second sending unit. The second receiving unit is configured to receive a third SRv6 packet sent by the first customer-side device, where the third SRv6 packet includes second indication information, and the second indication information indicates a second QoS requirement of the first tenant on the provider network. The second processing unit is configured to process the third SRv6 packet to obtain a fourth SRv6 packet. The second sending unit is configured to select, based on the second indication information, a second path that meets the second QoS requirement to forward the fourth SRv6 packet.

In an implementation, the apparatus 1200 may further include a third receiving unit, a third processing unit, and a third sending unit. The third receiving unit is configured to receive a fifth SRv6 packet sent by a third customer-side device of a second tenant, where the fifth SRv6 packet includes third indication information, and the third indication information indicates a third QoS requirement of the second tenant on the provider network. The third processing unit is configured to process the fifth SRv6 packet to obtain a sixth SRv6 packet. The third sending unit is configured to select, based on the third indication information, a third path that meets the third QoS requirement to forward the sixth SRv6 packet.

In an implementation, the apparatus 1200 may further include a first storage unit. The first storage unit is configured to locally store first configuration information, where the first configuration information indicates a correspondence between the first indication information and the first QoS requirement. The first sending unit 1203 is specifically configured to determine the first path based on the first QoS requirement in the first configuration information. In an example, the apparatus 1200 may further include a fourth sending unit. The fourth sending unit is configured to send the first configuration information to the first customer-side device. In an example, the fourth sending unit is specifically configured to send the first configuration information to the first customer-side device through a provider management device and a service management device to which the first PE device belongs.

In another implementation, the apparatus 1200 may further include a second storage unit. The second storage unit is configured to locally store second configuration information, where the second configuration information indicates a correspondence between the first indication information and the first path. The first sending unit 1203 is specifically configured to determine the first path based on the second configuration information.

In an implementation, the apparatus 1200 may further include a third storage unit. The third storage unit is configured to locally store third configuration information, where the third configuration information indicates a correspondence between the first indication information and a topology identifier, the topology identifier identifies a network topology of the provider network, the network topology indicates a plurality of PE devices in the provider network, and the first tenant accesses the provider network through the plurality of PE devices. In this case, the first sending unit 1203 is specifically configured to determine the first path based on the third configuration information.

In an implementation, the apparatus 1200 may further include a fourth storage unit. The fourth storage unit is configured to locally store fourth configuration information, where the fourth configuration information indicates a correspondence between an identifier of the first tenant and the first indication information, and the identifier of the first tenant may be an identifier of a VPN to which the first tenant belongs or a VNI of the first tenant, and uniquely identifies the first tenant. In this case, the first processing unit 1202 is specifically configured to process the first SRv6 packet based on the fourth configuration information to obtain the second SRv6 packet.

In an implementation, the apparatus 1200 may further include a fifth storage unit. The fifth storage unit is configured to locally store fifth configuration information, where the fifth configuration information indicates a correspondence between a first interface of the first PE device and the identifier of the first tenant. In this case, the first receiving unit 1201 is specifically configured to: receive the first SRv6 packet from the first interface, and determine that the first SRv6 packet is from the first tenant. The apparatus 1200 may further include: a determining unit configured to: before the first SRv6 packet is processed to obtain the second SRv6 packet, determine, based on the second configuration information, that the first indication information in the first SRv6 packet matches locally stored first indication information corresponding to the first tenant.

In an implementation, the apparatus 1200 may further include a first service unit and a fifth sending unit. The first service unit is configured to provide a first service to the first tenant according to the first QoS requirement. The fifth sending unit is configured to send charging information to a charging server, where the charging information includes first statistical information of first traffic sent by the first tenant and fourth indication information, the fourth indication information is used for determining a first charging rule corresponding to the first service, and the first traffic includes the first SRv6 packet. In the implementation, for specific implementations of performing operations by the first service unit and the fifth sending unit and achieved effects refer to related descriptions of S202 and S203 in the method 200.

In an implementation, the apparatus 1200 may further include a second service unit and a sixth sending unit. The second service unit is configured to provide a second service to the first tenant according to the second QoS requirement. The second service unit is configured to send second charging information to a charging server, where the second charging information includes second statistical information of second traffic sent by the first tenant and fifth indication information, the fifth indication information is used for determining a second charging rule corresponding to the second service, and the second traffic includes the third SRv6 packet.

It should be noted that, for an implementation and achieved technical effects in a charging scheme, refer to related descriptions of the method 200 shown in FIG. 9 and the charging system 1000 shown in FIG. 10.

In an implementation of the apparatus 1100 and the apparatus 1200, an outer destination internet protocol IP address of the first SRv6 packet is a first internet protocol version 6 IPv6 address, and the first IPv6 address is used for carrying the first indication information. In an example, the first IPv6 address belongs to a dedicated IPv6 address set allocated by the first PE device to the first tenant. The IPv6 address set includes a plurality of IPv6 addresses, and each IPv6 address in the plurality of IPv6 addresses corresponds to a different QoS requirement of the first tenant. In another example, a Function field or an Argument field of the first IPv6 address is used for carrying the first indication information.

In another implementation of the apparatus 1100 and the apparatus 1200, the first SRv6 packet includes the first indication information, and the first indication information is a service code corresponding to the first QoS requirement. In an example, an IPv6 extension header of the first SRv6 packet carries the first indication information. In another example, a Traffic Class field in an IPv6 header of the first SRv6 packet may carry the first indication information.

In an implementation of the apparatus 1100 and the apparatus 1200, the first QoS requirement includes at least one of the following: a path overhead requirement, a latency requirement, a bandwidth requirement, a link jitter requirement, a bit error requirement, and a to-be-allocated fiber wavelength or timeslot requirement.

In an implementation of the apparatus 1100 and the apparatus 1200, the first customer-side device may be a host, or the first customer-side device may be a CE device, or the first customer-side device is CPE.

It should be noted that, for specific implementations and achieved effects of the packet processing apparatus 1100 and the packet processing apparatus 1200 provided in embodiments of the present disclosure, refer to related descriptions in the method 100 and the method 200.

Figure 13:
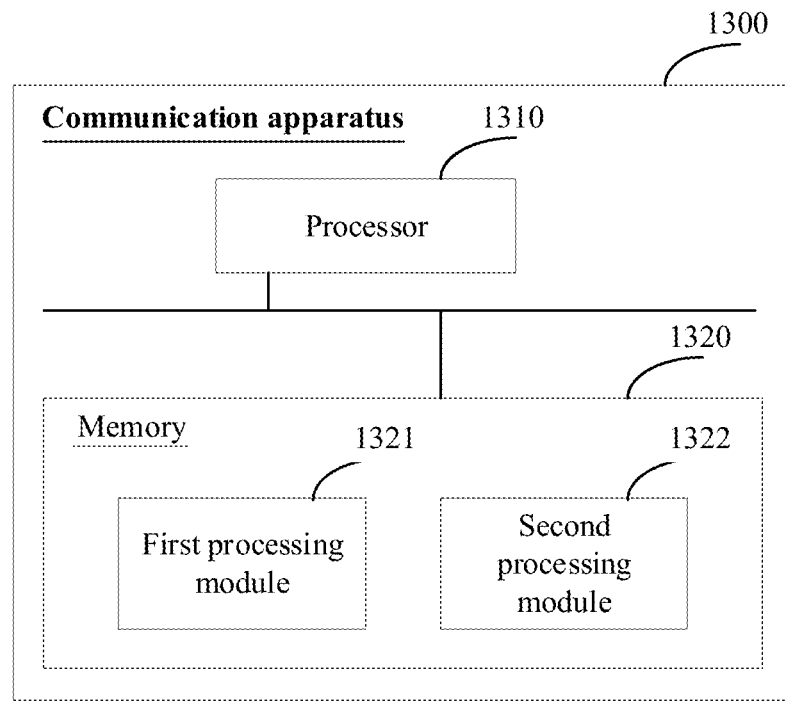
FIG. 13 is a schematic diagram of a structure of a communication apparatus 1300 according to an embodiment of the present disclosure.

In addition, an embodiment of the present disclosure further provides a communication apparatus 1300. FIG. 13 is a schematic diagram of a structure of the communication apparatus 1300 according to an embodiment of the present disclosure. The communication apparatus 1300 may be configured to perform the method 100 or the method 200 in the foregoing embodiments.

As shown in FIG. 13, the communication apparatus 1300 may include a processor 1310 and a memory 1320 coupled to the processor 1310. The processor 1310 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1310 may be one processor, or may include a plurality of processors. The memory 1320 may include a volatile memory, for example, a random-access memory (RAM). The memory may also include a non-volatile memory, for example, a read-only memory (ROM), a flash memory, a hard disk drive (HDD), or a solid-state drive (SSD). The memory 1320 may further include a combination of the foregoing types of memories. The memory 1320 may be one memory, or may include a plurality of memories. In an implementation, the memory 1320 stores computer-readable instructions, and the computer-readable instructions include a plurality of software modules, for example, a first processing module 1321 and a second processing module 1322. In addition, the computer-readable instructions may further include at least one of a third processing module, a fourth processing module, and a fifth processing module, each of which may correspond to one functional module in the first obtaining unit 1101 in the packet processing apparatus 1100, or may correspond to one functional module in the first processing unit 1202 in the packet processing apparatus 1200. After executing each software module, the processor 1310 may perform a corresponding operation according to an indication of the software module. In this embodiment, an operation performed by a software module in fact refers to an operation performed by the processor 1310 according to an indication of the software module. For example, "obtaining a first SRv6 packet" performed by the first processing module 1321 may in practice refer to "obtaining a first SRv6 packet" performed by the processor 1310 according to an indication of the first processing module 1321. In this case, the first processing module 1321 may correspond to the first obtaining unit 1101 in the packet processing apparatus 1100.

In an example, the communication apparatus 1300 may perform the method 100 in the foregoing embodiment. When the communication apparatus 1300 is configured to perform the method 100 in the foregoing embodiment, the processor 1310 is configured to perform all processing-related operations in the method 100. For example, the processor 1310 is configured to process the first SRv6 packet to obtain a second SRv6 packet.

In an example, the communication apparatus 1300 may perform the method 200 in the foregoing embodiment. When the communication apparatus 1300 is configured to perform the method 200 in the foregoing embodiment, the processor 1310 is configured to perform all processing-related operations in the method 200. For example, the processor 1310 is configured to provide a first service to a first tenant according to a first QoS requirement corresponding to first indication information.

Figure 14:
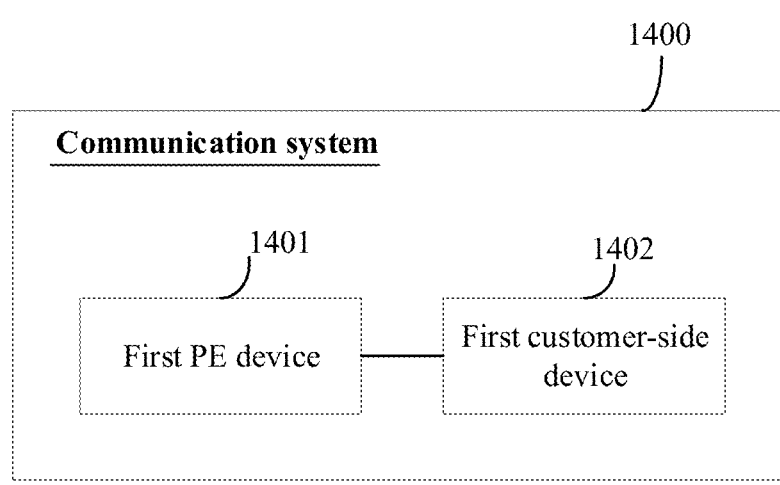
FIG. 14 is a schematic diagram of a structure of a communication system 1400 according to an embodiment of the present disclosure.

In addition, an embodiment of the present disclosure further provides a communication system 1400, as shown in FIG. 14. FIG. 14 is a schematic diagram of a structure of a communication system 1400 according to an embodiment of the present disclosure. The communication system 1400 may include a first PE device 1401 and a first customer-side device 1402.

The first PE device 1401 may be, for example, the PE device 1 in FIG. 1, or may be the PE device 31 or the PE device 32 in FIG. 7, and is configured to perform operations implemented by the first PE device in the method 100 and the method 200.

The first customer-side device 1402 may be, for example, the customer-side device 11 in FIG. 1, or may be the host 21 or the CPE 23 in FIG. 7, and is configured to perform operations implemented by the first customer-side device in the method 100 and the method 200.

For a specific implementation and an achieved effect of the communication system 1400, refer to related descriptions of the method 100 and the method 200.

This application further provides a computer-readable storage medium. The computer-readable storage medium stores instructions. When the instructions are run on a computer, the computer is enabled to perform any one or more operations in the method (for example, the method 100 or the method 200) in any one of the foregoing embodiments.

This application further provides a computer program product, including a computer program. When the computer program product is run on a computer, the computer is enabled to perform any one or more operations in the method (for example, the method 100 or the method 200) in any one of the foregoing embodiments.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in the present disclosure, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of embodiments.

In addition, service units in embodiments of the present disclosure may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of the present disclosure essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of the present disclosure. The storage medium includes any medium that can store program code, such as a Universal Serial Bus (USB) flash drive, a removable hard disk, a ROM, a RAM, a magnetic disk, or an optical disc.

A person skilled in the art should be aware that in the foregoing one or more examples, the services described in the present disclosure may be implemented by hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing specific implementations, the objectives, technical solutions, and the benefits of the present disclosure are further described in detail. It should be understood that the foregoing descriptions are merely example implementations of the present disclosure.

The foregoing embodiments are merely intended for describing the technical solutions of the present disclosure, but not for limiting the present disclosure. Although the present disclosure is described in detail with reference to the foregoing embodiments, a person of ordinary skill in the art can understand that they may still make modifications to the technical solutions described in the foregoing embodiments, or make equivalent replacements to some technical features thereof, without departing from the scope of the technical solutions of embodiments of the present disclosure.

What is claimed is:

1. A method, implemented by a first customer-side device of a first tenant, wherein the method comprises:
obtaining a first Segment Routing over Internet Protocol version 6 (SRv6) packet comprising first indication information indicating a first quality of service (QoS) requirement of the first tenant on a provider network;
sending the first SRv6 packet to a first provider edge (PE) device;

obtaining a second SRv6 packet comprising second indication information indicating a second QoS requirement of the first tenant on the provider network; and sending the second SRv6 packet to the first PE device.

2. The method of claim 1, wherein prior to obtaining the first SRv6 packet, the method further comprises obtaining a correspondence between the first indication information and the first QoS requirement.

3. The method of claim 2, wherein obtaining the correspondence comprises receiving, from the first PE device, configuration information indicating the correspondence.

4. The method of claim 2, wherein obtaining the correspondence comprises receiving, from a service management device, configuration information indicating the correspondence.

5. The method of claim 1, wherein the first SRv6 packet comprises a segment routing header (SRH), wherein the SRH comprises a segment identifier (SID) list, wherein the SID list comprises a SID of a second customer-side device belonging to the first tenant.

6. The method of claim 5, wherein the SID list further comprises a SID of a second PE device.

7. A method, implemented by a first provider edge (PE) device, wherein the method comprises:

receiving, from a first customer-side device of a first tenant, a first Segment Routing over Internet Protocol version 6 (SRv6) packet comprising first indication information indicating a first quality of service (QoS) requirement of the first tenant on a provider network;

processing the first SRv6 packet to obtain a second SRv6 packet;

selecting, based on the first indication information, a first path that meets the first QoS requirement, wherein an ingress node of the first path is the first PE device, and wherein an egress node of the first path is a second PE device; and forwarding the second SRv6 packet along the first path.

8. The method of claim 7, wherein the first SRv6 packet comprises a segment routing header (SRH), wherein the SRH comprises a segment identifier (SID) list, and wherein the SID list comprises a SID of a second customer-side device belonging to the first tenant.

9. The method of claim 8, wherein the SID list further comprises a SID of the second PE device.

10. The method of claim 7, wherein the first path is an SRv6 tunnel, a physical fiber link, or a label-switched path (LSP) that performs multi-protocol label switching (MPLS)-based forwarding.

11. The method of claim 7, further comprising:

receiving, from the first customer-side device, a third SRv6 packet comprising second indication information indicating a second QoS requirement of the first tenant on the provider network;

processing the third SRv6 packet to obtain a fourth SRv6 packet;

selecting, based on the second indication information, a second path that meets the second QoS requirement; and forwarding the fourth SRv6 packet along the second path.

12. The method of claim 7, further comprising:

receiving, from a third customer-side device of a second tenant, a fifth SRv6 packet comprising third indication information indicating a third QoS requirement of the second tenant on the provider network;

processing the fifth SRv6 packet to obtain a sixth SRv6 packet;

selecting, based on the third indication information, a third path that meets the third QoS requirement; and forwarding the sixth SRv6 packet along the third path.

13. The method of claim 7, wherein selecting the first path comprises determining the first path based on locally-stored first configuration information indicating a correspondence between the first indication information and the first QoS requirement.

14. The method of claim 13, further comprising sending the first configuration information to the first customer-side device.

15. The method of claim 7, wherein selecting the first path comprises determining the first path based on locally-stored second configuration information indicating a correspondence between the first indication information and the first path.

16. The method of claim 7, wherein selecting the first path comprises determining the first path based on locally-stored third configuration information indicating a correspondence between the first indication information and a topology identifier, wherein the topology identifier identifies a network topology of the provider network, and wherein the network topology indicates a plurality of PE devices in the provider network configured to provide the first tenant access to the provider network.

17. The method of claim 7, wherein processing the first SRv6 packet to obtain the second SRv6 packet comprises processing the first SRv6 packet based on locally-stored fourth configuration information to obtain the second SRv6 packet, wherein the fourth configuration information indicates a correspondence between a first identifier of the first tenant and the first indication information, and wherein the first identifier is a second identifier of a virtual private network (VPN) of the first tenant or a virtual network identifier (VNI) corresponding to the first tenant.

18. The method of claim 7, further comprising:

providing a first service to the first tenant according to the first QoS requirement; and sending, to a charging server, charging information comprising first statistical information of first traffic from the first tenant and comprising fourth indication information for determining a first charging rule corresponding to the first service, and wherein the first traffic comprises the first SRv6 packet.

19. A customer-side device of a first tenant, the customer-side device comprising:

a memory configured to store instructions; and one or more processors coupled to the memory and configured to execute the instructions to cause the customer-side device to:

obtain a first Segment Routing over Internet Protocol version 6 (SRv6) packet comprising first indication information indicating a first quality of service (QoS) requirement of the first tenant on a provider network; and send the first SRv6 packet to a first provider edge (PE) device.

20. The customer-side device of claim 19, wherein the one or more processors are further configured execute the instructions to cause the customer-side device to:

obtain a second SRv6 packet comprising second indication information indicating a second QoS requirement of the first tenant on the provider network, wherein the second QoS requirement is different from the first QoS requirement; and
send the second SRv6 packet to the first PE device.

* * * * *